(12) United States Patent
Conger et al.

(10) Patent No.: US 11,803,690 B2
(45) Date of Patent: Oct. 31, 2023

(54) SIMULATED THUMBNAIL PREVIEWS FOR FILES

(71) Applicant: Microsoft Technology Licensing, LLC, Redmond, WA (US)

(72) Inventors: David J. Conger, Issaquah, WA (US); Ayuba Audu, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 180 days.

(21) Appl. No.: 17/145,751

(22) Filed: Jan. 11, 2021

(65) Prior Publication Data

US 2022/0222416 A1 Jul. 14, 2022

(51) Int. Cl.
*G06F 40/106* (2020.01)
*G06F 16/93* (2019.01)
*G06F 16/16* (2019.01)
*G06F 16/11* (2019.01)

(52) U.S. Cl.
CPC .......... *G06F 40/106* (2020.01); *G06F 16/116* (2019.01); *G06F 16/168* (2019.01); *G06F 16/93* (2019.01)

(58) Field of Classification Search
None
See application file for complete search history.

(56) References Cited

U.S. PATENT DOCUMENTS

| | | | |
|---|---|---|---|
| 8,046,717 B1 | 10/2011 | Goel et al. | |
| 8,477,122 B2 | 7/2013 | Takagi | |
| 11,308,074 B1* | 4/2022 | Wyatt | H04L 65/70 |
| 2004/0205627 A1 | 10/2004 | Rosenholtz et al. | |
| 2005/0091612 A1* | 4/2005 | Stabb | G06F 3/04817 |
| | | | 715/708 |
| 2005/0210414 A1* | 9/2005 | Angiulo | G06F 16/958 |
| | | | 707/E17.116 |
| 2006/0036568 A1* | 2/2006 | Moore | G06F 16/168 |

(Continued)

OTHER PUBLICATIONS

Curry, et al., "An On-line Collaborative Data Management System" copyright 2011 IEEE, 10 pages. (Year: 2011).*

(Continued)

*Primary Examiner* — Amelia L Tapp

(57) ABSTRACT

A thumbnail preview of a file enables a user to recognize the file without opening it. An algorithmic approach to generating simulated thumbnail previews is provided. This approach includes executing rules for determining and implementing one or more rendering schemas to simulate different content types within a portion of a file. A simulated thumbnail preview is generated from the simulated content types based on a file structure. Since users may rely on the general structure and distinguishing content elements of a thumbnail for recognizing a file, these distinguishing elements are maintained based on different rendering schemas used to create a simulated thumbnail. Moreover, the algorithmic approach promotes consistent simulated thumbnails across clients, regardless of client processing capabilities, form factors, customized theming, or the like. Based on the rules for rendering various content types, the simulated thumbnails are also consistently generated across documents.

20 Claims, 15 Drawing Sheets

(56) References Cited

U.S. PATENT DOCUMENTS

| | | | |
|---|---|---|---|
| 2013/0151974 A1* | 6/2013 | Cho | G06F 40/137 715/799 |
| 2016/0170985 A1 | 6/2016 | Lewis et al. | |
| 2017/0046027 A1 | 2/2017 | Tanaka | |
| 2020/0159391 A1 | 5/2020 | Kleinpeter | |

OTHER PUBLICATIONS

Cockburn, et al., "Faster Document Navigation with Space-Filling Thumbnails", In Proceedings of the SIGCHI Conference on Human Factors in Computing Systems, Apr. 22, 2006, 10 Pages.

Erol, et al., "Multimedia Thumbnails for Documents", In Proceedings of the 14th ACM international conference on Multimedia, Oct. 23, 2006, pp. 231-240.

"International Search Report and Written Opinion Issued in PCT Application No. PCT/US21/061047", dated Mar. 17, 2022, 12 Pages.

"File thumbnails—Automated Thumbnail Generation", Retrieved from: https://web.archive.org/web/20180930112450/https:/help.joomlatools.com/article/54-file-thumbnails, Sep. 30, 2018, 6 Pages.

"Generate Thumbnails", Retrieved from: https://help.oclc.org/Metadata_Services/CONTENTdm/Project_Client/Add_items_and_objects/Generate_thumbnails?sl=en, Retrieved Date: Nov. 19, 2020, 7 pages.

"QuickLook Thumbnailing", Retrieved from: https://web.archive.org/web/20200617091133/https:/developer.apple.com/documentation/quicklookthumbnailing, Jun. 17, 2020, 3 Pages.

Krol, Jake, "Adobe Makes it Easier to Share and edit PDFs in Acrobat DC", Retrieved from: https://mashable.com/article/adobe-updates-acrboat-dc-connect-apps-sharing/, Oct. 2, 2018, 9 pages.

\* cited by examiner

FIG. 5

SIMULATED THUMBNAIL PREVIEWS FOR FILES

BACKGROUND

In today's digital world, users are likely to save and store hundreds, or even thousands, of files of various file types—from documents to images to audio files, etc. In aspects, users may store these files locally on a client device or remotely on one or more servers (e.g., hosting an enterprise network) or on a service (e.g., hosted by a cloud computing environment), for example. Regardless of where they are stored, these files are often organized by file name into different folders for later selection and retrieval. In some aspects, users may be able to view these files in different views that identify the files with various degrees of specificity. For instance, a "list view" may merely provide a list of file names for identifying a files, whereas a "grid view" may provide file names with additional information, such as a file type icon (e.g., differentiating a word processing document from an image file from a spreadsheet). However, when users store multiple files of the same type (e.g., multiple word processing documents or multiple spreadsheets), the file type icon is of little value. As a result, in some cases, thumbnails representative of files may be provided. In aspects, a "thumbnail" may be a visual representation of a file, such as an image capture of the file, to aid users in distinguishing different files of the same file type, for instance.

However, capturing images for thumbnails of documents can present a number of challenges, either from the client side or the server/service side. While a client making the last edit could capture an image, the image may not uniformly represent the file. For instance, image captures are often based on a current view of a document. Thus, different image captures of the same document may result when users are viewing/editing different portions of the document. Moreover, where clients may range from mobile devices to tablets to desktop computers, image captures by different clients may be based on different form factors, causing thumbnails of the same document or different documents in a collaborative, multi-user environment to be non-uniform. Different clients may also exhibit different theming, accessibility support, or processing capabilities that impact the uniformity of thumbnails across files. Additionally, where files are stored remotely, uploading image captures may impose increased cost (e.g., in terms of network bandwidth) than merely uploading the text of a document, for example.

While server-side image capture may solve consistency problems, other challenges arise. For instance, a service may need to run instances of different client applications (e.g., from word processing applications to notebook applications to media players) to load and render the file in order to perform the image capture, which may not be a common functionality of the service. In this case, the service may have to run a client-based infrastructure that is not ideal for a service workload. Additional functionality that may not be normally required might also be needed in the service to retrieve files. Any or all of these issues may increase the cost of the service to the consumer. The consistency of service image capture, consistency done on the client side with lower overall costs, would be ideal.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Traditionally, an image capture of a document (e.g., a first page of the document) must be reduced to a certain extent to be used as a thumbnail preview. The purpose of a thumbnail preview is to enable a user to recognize a document from among a plurality of documents. However, in minimized form, while some aspects of the image capture are distinguishable by a user for document recognition, other aspects are not. That is, rather than deciphering text, a user is likely to rely on a general structure and distinguishing elements (e.g., an image, a bulleted list, section headers followed by blocks of text, and the like) in the thumbnail to recognize a document. In this case, a thumbnail need only convey distinguishing features of a document, whereas rendering non-distinguishing aspects, such as unformatted (or minimally formatted) text, is unnecessary. In aspects, "unformatted" text may refer to text that is minimally formatted. That is, while the text may comprise some formatting (such as font size, italics, or underlining), when minimized, the minimally formatted text may not be intelligible or distinguishable from other textual content. For example, when minimized, italicized or underlined text may not be distinguishable from text that is not italicized or underlined.

As image captures of documents are costly and accompanied by a number of challenges, on both client and service sides, the present methods and systems implement an algorithmic approach to generating simulated thumbnail previews. In aspects, the algorithmic approach may involve evaluating a file to determine a file structure and one or more content types. Content types may correspond to various content elements within a file, such as a title, one or more section headers, one or more images, one or more graphs or tables, bulleted or numbered lists, unformatted (or minimally formatted) text, hyperlinks, or the like. The algorithmic approach may comprise executing a set of rules for determining and implementing one or more rendering schemas for simulating different content types, including rendering schemas associated with a pseudo capture, a proxy simulation, or a proxy chunk simulation, for instance. Since users are more likely to rely on the general structure and distinguishing elements of the thumbnail for recognizing a document, these features are maintained based on the different rendering schemas used to create the simulated thumbnails.

In aspects, a computer-implemented method for simulating a thumbnail preview is provided. The method includes receiving an indication to store a document and evaluating the document to determine a document structure comprising a plurality of content types. The method further includes determining a portion of the document reducible to a viewable area of a thumbnail preview and, based on the portion, identifying at least a first content type of the plurality of content types, where the first content type includes first content in a first format. Based on the portion, the method includes identifying at least a second content type of the plurality of content types, where the second content type comprises second content in a second format. Additionally, the method includes determining a first rendering schema for the first content type that reflects the first format and determining a second rendering schema for the second content type that simulates the second content. The method further involves generating a simulated thumbnail preview of the document by rendering the first content type according to the first rendering schema and the second content type according to the second rendering schema.

In further aspects, a client device is provided. The client device includes at least one processor and at least one memory storing computer-executable instructions that when executed by the at least one processor cause the client device to perform operations. The operations include receiving an indication to store a file and evaluating the file to determine a file structure comprising a plurality of content types. The operations further include identifying at least a first content type of the plurality of content types, where the first content type includes first content in a first format, and identifying at least a second content type of the plurality of content types, where the second content type includes second content in a second format. Additionally, the operations include generating a file map comprising at least the file structure, the first content type, and the second content type. The operations also include determining a first rendering schema for the first content type that reflects the first format and determining a second rendering schema for the second content type that simulates the second content. Additionally, the operations include generating a simulated thumbnail preview of the file by rendering the first content type according to the first rendering schema and the second content type according to the second rendering schema.

In still further aspects, a computer storage medium is provided, the computer storage medium storing computer-executable instructions that when executed by a processor cause a server system to perform operations. The operations include receiving a file upload and receiving a file map for the file comprising a file structure and a plurality of content types. Based on the plurality of content types, the operations further include retrieving at least a first content type comprising first content in a first format and retrieving at least a second content type comprising second content in a second format. Additionally, the operations include determining a first rendering schema for the first content type that reflects the first format and determining a second rendering schema for the second content type that simulates the second content. The operations also include generating a simulated thumbnail preview of the file by rendering the first content type according to the first rendering schema and the second content type according to the second rendering schema, wherein at least the file structure of the file is displayed by the simulated thumbnail preview.

Any of the one or more above aspects in combination with any other of the one or more aspects. Any of the one or more aspects as described herein.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTIONS OF THE DRAWINGS

Non-limiting and non-exhaustive examples are described with reference to the following figures.

FIG. 5 depicts an example of a top portion of a document and a corresponding image-based thumbnail in accordance with examples of the present disclosure.

DETAILED DESCRIPTION

Figure 1:
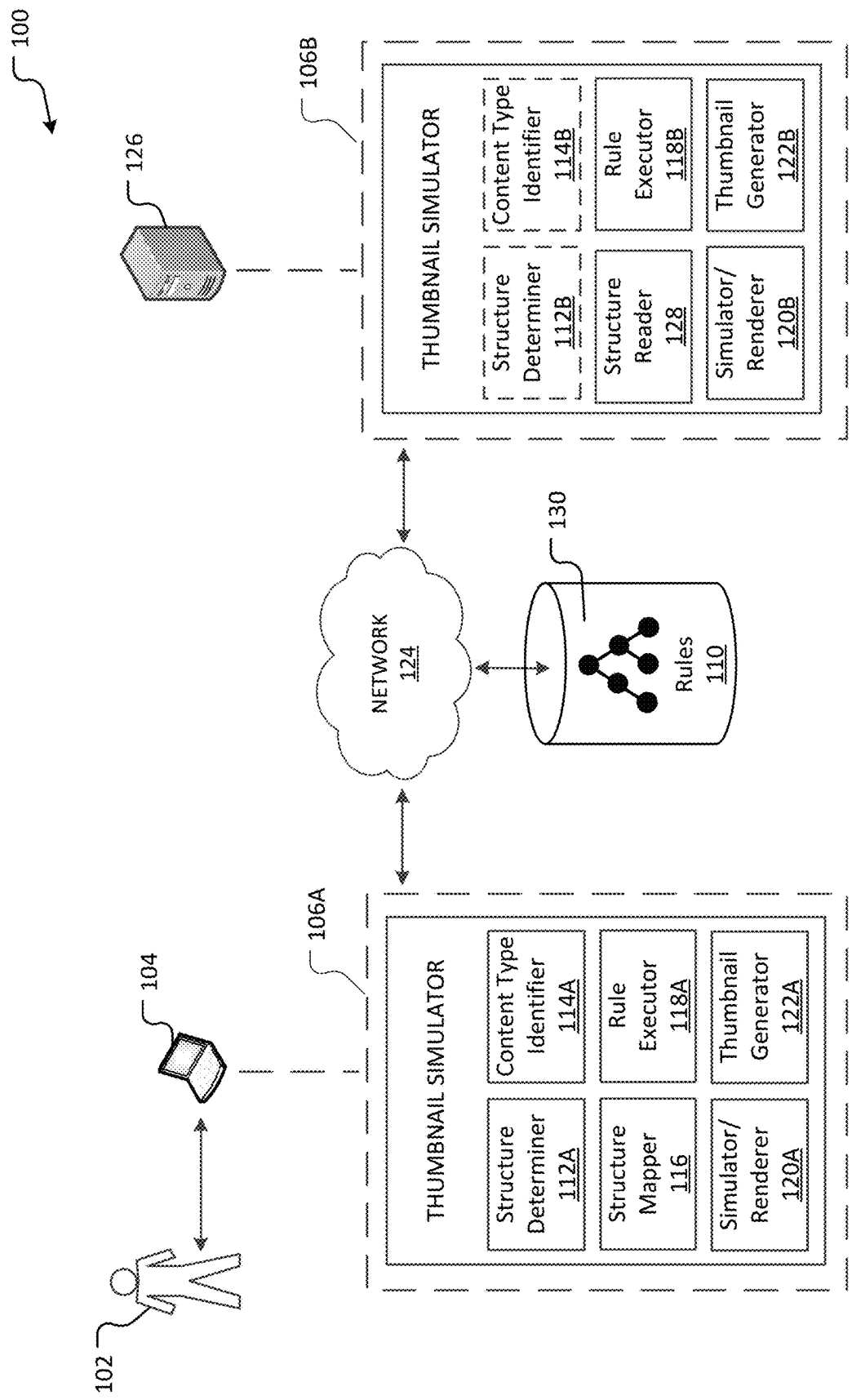
FIG. 1 illustrates an example system for simulating thumbnail previews in accordance with aspects of the present disclosure.

Various aspects of the disclosure are described more fully below with reference to the accompanying drawings, which from a part hereof, and which show specific example aspects. However, different aspects of the disclosure may be implemented in many different ways and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

Traditionally, an image capture of a document (e.g., a first page of the document) must be reduced to a certain extent to be used as a thumbnail preview. The purpose of a thumbnail preview is to enable a user to recognize a document from among a plurality of documents. However, in minimized form, while some aspects of the image capture are distinguishable by a user for document recognition, other aspects are not. That is, rather than deciphering text, a user is likely to rely on a general structure and distinguishing elements (e.g., an image, a bulleted list, section headers followed by blocks of text, and the like) in the thumbnail to recognize a document. In this case, a thumbnail need only convey distinguishing features of a document, whereas rendering non-distinguishing aspects, such as unformatted (or minimally formatted) text, is unnecessary. In aspects, "unformatted" text may refer to text that is minimally formatted. That is, while the text may comprise some formatting (such as font size, italics, or underlining), when minimized, the minimally formatted text may not be intelligible or distinguishable from other textual content. For example, when minimized, italicized or underlined text may not be distinguishable from text that is not italicized or underlined.

As image captures of documents are costly and accompanied by a number of challenges, on both client and service sides, the present methods and systems implement an algorithmic approach to generating simulated thumbnail previews. In aspects, the algorithmic approach may involve evaluating a file to determine a file structure and one or more content types. Content types may correspond to various content elements within a file, such as a title, one or more section headers, one or more images, one or more graphs or tables, bulleted or numbered lists, unformatted (or minimally formatted) text, hyperlinks, or the like. The algorithmic approach may comprise executing a set of rules for determining and implementing one or more rendering schemas for simulating different content types, including rendering schemas associated with a pseudo capture, a proxy simulation, or a proxy chunk simulation, for instance. Since users are more likely to rely on the general structure and distinguishing elements of the thumbnail for recognizing a document, these features are maintained based on the different rendering schemas used to create the simulated thumbnails.

This algorithmic approach offers a number of benefits over actual image captures of a document used to generate thumbnail previews. In aspects, while a document is open, a client is able to determine a basic document structure and identify content types within a viewable area of the document. Based on the document structure, rules for handling different content types can be executed on the client to generate a simulated thumbnail preview without requiring the additional processing and memory capabilities required for image capture. Based on the rules, simulated thumbnail previews can be consistently generated across clients, regardless of client processing capabilities, form factors, customized theming, or the like. Additionally, by fixing the size and location (e.g., top of document) of the viewable area, simulated thumbnail previews may be consistently generated across documents, regardless of whether the viewable area was last viewed (or ever viewed) by the client. Edits to a file may alter the simulated thumbnail only when the edits result in distinguishable changes to the viewable area, limiting the need to generate new thumbnail previews each time the file is saved.

In aspects, the client may also create a lightweight mapping of the document structure. Unlike large image captures, the lightweight mapping is easily uploaded with the file for use by a service in simulating a thumbnail preview of the file. In this way, the service need not run an instance of a client application to load the file and generate the thumbnail. The lightweight mapping may accompany the file as metadata, for example, or may be uploaded to the service as an alternate stream associated with the document. Furthermore, based on the rules, the thumbnail preview may be consistently generated by the service based on the document structure and content types retrieved from the document map. Thus, the simplified renderer for simulating thumbnails can be scaled to a variety of different devices, including thin clients and headless systems, like a service. Additionally, users may notice relatively few, if any, differences in document recognition based on simulated thumbnails, but systems will gain the benefits of leaner and more consistent rendering methods, which can be implemented by either clients or services, or both.

FIG. 1 illustrates an example system for simulating thumbnail previews in accordance with aspects of the present disclosure.

As illustrated in FIG. 1, system 100 provides a client thumbnail simulator 106A for execution on a client and a service thumbnail simulator 106B for executing on a service to simulate thumbnails for file recognition. The thumbnail simulator 106A executing on client device 104 (e.g., associated with user 102) includes one or more components for performing various aspects of thumbnail simulation, including a structure determiner 112A, a content type identifier 114A, a structure mapper 116, a rule executor 118A, a simulator/renderer 120A, and a thumbnail generator 122A. In aspects, client device 104 may be a mobile phone, a laptop, a tablet, a multi-screen handheld device, a desktop computer, or the like. Similarly, the thumbnail simulator 106B includes one or more components for performing various aspects of thumbnail simulation on one or more servers (e.g., server 126), which may be associated with a service, including an optional structure determiner 112B, an optional content type identifier 114B, a structure reader 128, a rule executor 118B, a simulator/renderer 120B, and a thumbnail generator 122B. The various components of thumbnail simulator 106A and 106B may communicate and pass data between the other components.

Thumbnail simulator 106A may include structure determiner 112A that may evaluate a file to determine a file structure. In further aspects, structure determiner 112A may determine a file type for the file. File types may include audio file types, image file types, document file types, video file types, and the like. In particular, document file types may include a word processing file type, a spreadsheet file type, a notebook file type, a presentation file type, and the like. Based on the file type, structure determiner 112A may evaluate various structural elements of a file, such as slide delineations, page delineations, paragraph delineations, line delineations, character delineations, spreadsheet row/column/cell delineations, or the like. In some cases, structure determiner 112A may parse the file to identify the file structure; in other cases, structure determiner 112A may retrieve information regarding the file structure from metadata or an "alternative stream" associated with the file. In aspects, an "alternative stream" may be used to convey information regarding a file that is stored remotely, e.g., on a service.

To promote consistency, a thumbnail may be of a predetermined size and a viewable area of the document may correspond to a portion of the document that is discernable by a user when reduced to the predetermined size. For instance, the portion of the document may correspond to "X" lines of unformatted (or minimally formatted) text, a first page of the document, a first slide of a presentation, a number of rows of a spreadsheet, or the like. Additionally, content type identifier 114A may identify various content elements within the viewable area, such as a title, one or more section headers, one or more images, one or more graphs or tables, bulleted or numbered lists, unformatted (or minimally formatted) text, hyperlinks, or the like. Such content elements may be referred to as "content types." For different documents (or document types), content types may occur in different combinations or different arrangements within a viewable area. In some cases, the content types or content type arrangement within the viewable area of a document may change, e.g., based on document editing. Such changes may or may not be discernable to a user within a thumbnail representation. For instance, addition of a content type such as an image or a table may be discernable, whereas edited words within a paragraph of text may not be discernable.

Thumbnail simulator 106A may also include a structure mapper 116. The structure mapper 116 may create a package of information (e.g., a document map) regarding the document structure, the viewable area, one or more content types, content type arrangement, and the like. The package may be associated with the document file (e.g., as metadata) or provided as an alternate stream associated with the document file, for example. In this case, when a file is uploaded for storage, a service may use the package to create a thumbnail image without needing to load the document for determining such information.

Rule executor 118A may retrieve rules 110 from a database 130 via network 124. In other aspects, rules 110 may be retrieved locally on client 104 (not shown). Rule executor 118A may execute rules 110 for generating simulated thumbnail previews, for instance. Rules 110 may specify conditions for implementing different rendering schemas to simulate different content types. In aspects, a condition may relate to a particular document type, document structure, content type, or the like. For instance, based on one or more conditions, a combination of rendering schemas may be determined for simulating a thumbnail preview of a file. These rendering schemas may range from relatively accurate simulated representations of a document (e.g., a "pseudo capture"), to pre-generated proxy thumbnails that represent different characteristic or generalized styles of a document type (e.g., a "proxy simulation"), to pre-generated proxies of content types that may be combined to create a simulated thumbnail for a document (e.g., a "proxy chunk simulation").

Traditionally, an image capture of a document (e.g., a first page of the document) must be reduced to a certain extent to be used as a thumbnail preview. The purpose of a thumbnail preview is to enable a user to recognize a document from among a plurality of documents. However, in minimized form, while some aspects of the image capture are distinguishable by a user for document recognition, other aspects are not. That is, rather than deciphering text, a user is likely to rely on a general structure and distinguishing elements (e.g., an image, a bulleted list, section headers followed by blocks of text, and the like) in the thumbnail to recognize a document. In this case, a thumbnail need only convey distinguishing features of a document, whereas rendering non-distinguishing aspects, such as unformatted (or minimally formatted) text, is unnecessary. In aspects, "unformatted" text may refer to text that is minimally formatted. That is, while the text may comprise some formatting (such as font size, italics, or underlining), when minimized, the minimally formatted text may not be intelligible or distinguishable from other textual content. For example, when minimized, italicized or underlined text may not be distinguishable from text that is not italicized or underlined.

As image captures of documents are costly and accompanied by a number of challenges, on both client and service sides, the present disclosure implements an algorithmic approach to generating simulated thumbnail previews. In aspects, the algorithmic approach may involve evaluating a file to determine a file structure and one or more content types. Content types may correspond to various content elements within a file, such as a title, one or more section headers, one or more images, one or more graphs or tables, bulleted or numbered lists, unformatted (or minimally formatted) text, hyperlinks, or the like. The algorithmic approach may comprise executing a set of rules (e.g., logic) for determining and implementing one or more rendering schemas for simulating different content types, including rendering schemas associated with a pseudo capture, a proxy simulation, or a proxy chunk simulation. For instance, a series of estimates of the structure of the document within what is likely to be a viewable range may be calculated. In some cases, content may be obscured (or masked) that cannot be read in a minimized thumbnail. For instance, if the width at which the screen would be captured for a thumbnail contains between 135-142 characters, it could be calculated that the actual text of 434 characters could be represented by a first indented line, three full width lines, and one short partial line of pseudo text or masking. A render can then build (or simulate) a preview of the document based on logic without actually using document data or having to take into account non-distinguishing styling such as font face. Similar methods can apply to bulleted lines, hyperlinks, titles, headers, tables, images, etc.; however, in this case, indications of distinguishing formatting can be retained, such as maintaining bullets or indicating bolded font by a darker hue of masking.

This algorithmic approach offers a number of benefits over actual image captures of a document used to generate thumbnail previews. In aspects, while a document is open, a client is able to determine a basic document structure and identify content types within a viewable area of the document. Based on the document structure, rules for handling different content types can be executed on the client to generate a simulated thumbnail preview without requiring the additional processing and memory capabilities required for image capture. Based on the rules, simulated thumbnail previews can be consistently generated across clients, regardless of client processing capabilities, form factors, customized theming, or the like. Additionally, by fixing the size and location (e.g., top of document) of the viewable area, simulated thumbnail previews may be consistently generated across documents, regardless of whether the viewable area was last viewed (or ever viewed) by the client. Edits to a file may alter the simulated thumbnail only when the edits result in distinguishable changes to the viewable area, limiting the need to generate new thumbnail previews each time the file is saved. In aspects, the client may also create a lightweight mapping of the document structure. Unlike large image captures, the lightweight mapping is easily uploaded with the document for use by a service in simulating a thumbnail preview. In this way, the service need not run an instance of a client application or a client renderer to load the document and generate the thumbnail. The lightweight mapping may accompany the document as metadata, for example, or may be uploaded to the service as an alternate stream associated with the document. Furthermore, based on the rules, the thumbnail preview may be consistently generated by the service based on the document structure and content types retrieved from the document map.

In some cases, statistics related to document recognition based on different simulated thumbnails may be collected. These statistics may indicate how successful different simulated thumbnails created by different rendering schemas are in terms of document recognition, for example. In some cases, the statistics may be used to train the algorithm (e.g., based on machine learning) to select rendering schemas for particular document types or document structures that generate the most successful simulated thumbnails. In other cases, where different simulated thumbnails are similarly successful or acceptably successful (e.g., within a threshold of success), the algorithm may be trained to select the most cost efficient rendering schema for generating the thumbnail, e.g., in terms of processing resources, time to generate, thumbnail transmission size, etc. As should be appreciated, the algorithm may be continually trained and updated to account for evolving client capabilities, user behavior, and the like.

As noted above, the algorithmic approach relies on rules 110 to generate simulated thumbnail previews. For instance, to generate relatively accurate thumbnail simulations (e.g., pseudo captures), the rules 110 may specify that distinguishable content types, such as formatted text (e.g., section headers, bolded text, bulleted or numbered lists), objects (e.g., tables, graphs, images), or hyperlinks (e.g., rendered in colored font), should be rendered to maintain recognizable features. However, maintaining these recognizable features may be achieved by a variety of rendering schemas. These rendering schemas may involve a range of partial to full masking of content types.

Again, the goal of a thumbnail preview is to enable users to recognize a document without needing to open the document. To achieve this goal, rules 110 may designate different content types for different degrees of simulated rendering. For instance, some content types may generally be readable by users in a minimized thumbnail and may be rendered to conserve content fidelity (e.g., rendering as close as possible to the original content). These readable content types may include, for example, text of an "H1" header (e.g., title) or "H2" headers (e.g., section headers). Other content types may generally be distinguishable (but not necessarily readable) in a minimized form and may be rendered to maintain distinguishing features, such as structure, coloring (e.g., within an image), size, layout, bulleting, numbering, and/or text formatting (e.g., bolding, font size, font color). These distinguishable content types may include images, tables, bulleted or numbered lists, bolded text, and colored hyperlinks, for instance. Still other content types may not be readable or distinguishable in a thumbnail preview. That is, when minimized, these content types do not enable a user to distinguish one document from another based on the thumbnail preview. Non-distinguishing content types may include unformatted text, italicized or underlined text, table text or data, text that would effectively render at a size less than 6 pt. font, and the like.

Various rendering schemas may be defined for handling different content types when generating a pseudo capture. With respect to readable content types, such as H1 or H2 headers, a first rendering schema (e.g., partial masking) may provide one or more rules 110 specifying that actual header content should be rendered at a position determined by the document structure. This may be achieved without an image capture by extracting the H1 or H2 content from the document structure, for example. In another example, the viewable area of the document may be converted to an intermediate document format. This minimizes the document information needed for rendering to only the content that is required for the thumbnail. Where text is to be replaced with pseudo content (e.g., masking or random content), the document information may simply specify a number of characters for replacement. A second rendering schema (e.g., full masking) may provide one or more rules 110 for masking the H1 and/or H2 content while maintaining distinguishing features, such as rendering in larger masking, masking in a darker hue, and/or masking with section number or letter designators retained. As with the first rendering schema, the rules may specify that the masked H1/H2 headers be rendered at the position within the viewable area specified by the document structure. While this example is described with reference to a first and second rendering schemas, any number of schemas may be implemented within the scope of the present disclosure. Moreover, different schemas may be selected for rendering different content types associated with the same document.

With respect to distinguishing content types such as images, the details of an image in a minimized thumbnail may not be fully discernable to a user; however, certain colors or elements of the image may be recognizable or distinguishable. In this case, a third rendering schema may provide one or more rules 110 for rendering the image in minimized form at a position in the viewable area according to the document structure. As an image may be an inserted object within the document, instructions for rendering the image may be extracted from the document structure without requiring an image capture. In contrast, a fourth rendering schema may provide one or more rules 110 for rendering an image placeholder (e.g., an image icon) at the position in the viewable area according to the document structure. In this case, while a user cannot detect features of the image, the mere fact that an image is present in the viewable area may enable the user to recognize the document from the simulated thumbnail preview. As should be appreciated, different combinations of rendering schemas for different content types may be implemented. For instance, the first rendering schema for readable content types may be combined with the fourth rendering schema for rendering image icons in place of images; alternatively, the second rendering schema for readable or non-readable text can be combined with the third rendering schema for actual rendering of images in minimized size. As should be appreciated, any number of schemas and schema combinations implemented for different content types are within the scope of the present disclosure.

With respect to distinguishing content types such as tables, users may often detect a general structure of a table without deciphering table text or data from a minimized thumbnail preview. In this case, to recognize a document from a simulated thumbnail preview, one or more rules 110 may be provided that specify rendering a general structure and relative height of a table at a position determined by the document structure, with table text and data being masked or not rendered at all. Here, even where table text and data is not discernable, a document may be recognizable based on the table structure and relative height in a simulated thumbnail preview. Similar to an image, a table may be an inserted object within the document and parameters of the table (e.g., table structure and height) may be extracted from the document structure without requiring an image capture. In another example, one or more rules 110 may be provided for rendering a table placeholder (e.g., a table icon) at a position in the viewable area according to the document structure. In this case, while a table rendering is not provided, the mere fact that a table is present in the viewable area may enable the user to recognize the document from the simulated thumbnail preview.

With respect to distinguishing content types such as bulleted or numbered lists, users may detect a differentiated layout, but may not be able to decipher bulleted/numbered text in a minimized thumbnail preview. In this case, to recognize a document from the simulated thumbnail preview, one or more rules 110 may be provided that specify rendering a distinguishing layout of bulleted or numbered lists while simulating text content (either by masking or random content). Similarly, with respect to distinguishing content types such as colored hyperlinks or bolded text, users may detect the differentiated text formatting without being able to decipher the text. In this case, one or more rules 110 may be provided that specify simulating the text with distinguishing formatting (e.g., based on differentiated masking). In aspects, masking may refer to solid blocks or bars representing a general width of textual content without rendering actual text or maintaining word breaks. The masking may maintain distinguishing formatting, such as large text, bolded text or colored text, for instance, by increasing a masking bar height or by rendering the masking bar in a darker hue or in a particular color, respectively. Random (or pseudo) text may refer to rendering random characters organized into various length sets and separated by spaces. Although random content is unintelligible, when minimized, the random content approximates the look of text. Similar to masking, the random content may maintain indications of distinguishing formatting by enlarging the characters or rendering the characters in a dark or colored font, for example.

For non-distinguishing content types, such as unformatted text, italicized or underlined text, table text, and the like, content may be rendered as masked or random content. In some aspects, the masked content may correspond to a relative number of lines of the original content. In other aspects, the masked content may be provided in a generalized form, such as by indicating a standard paragraph of unformatted text with an indented first line, three full lines, and a partial last line.

As noted above, the algorithmic approach may involve implementing rendering schemas associated with a pseudo capture, a proxy simulation, or a proxy chunk simulation, for instance. In addition to the examples associated with pseudo capture described above, a proxy simulation may involve simulating a thumbnail preview using a fixed set of pre-generated proxy thumbnails representative of characteristic content arrangements for different document types. For instance, with a limited number of elements and a limited amount of space considered against the likelihood of the elements to appear at or near the top of the document, a set of potential document styles may be created and then selected based on elements contained within the top of a particular document. Common proxy thumbnails could include, for example, "partial content with full header," "partial content with partial header," "full content with full header," "full content with partial header," "two header-based chunks," "three header-based chunks," "partial content with bullet list," "full content with bullet list," "full content with individual lines," "multiple paragraphs," "paragraph and header-based bullet list," "paragraph and two header-based bullet lists," and the like. In the case of proxy simulation, while the simulated thumbnail may not be a completely accurate representation of a document, it may still provide general differentiation from other documents in a file grid view.

In yet another example, since a fixed set of proxy thumbnails may be difficult to generate and/or match to a particular document, a proxy chunk simulation may be implemented. In this case, chunks of general document elements (or content types) may be built and combined based on the structure of a particular document. For instance, if the document includes a series of bulleted lists, each list including three bullets, proxy chunks for a header and three indented bullets may be repeated three times. This would give a more accurate representation of the document than the static proxy thumbnails in the example above. In some cases, a proxy chunk for a bulleted list, a numbered list, or a dashed list could be represented in the same way, e.g., as an indented set of lines. In aspects, a proxy chunk for a single bullet may be generated and may be repeated to simulate an actual number of bullets associated with a document. Similarly, proxy chunks for bullets having one line of text, two lines of text, and so on, may be provided to simulate an actual number of lines for various bulleted content. Additionally, proxy chunks representing paragraphs may be provided with varying numbers of lines to accurately represent actual paragraphs of the document. In contrast, more generalized proxy chunks may be generated, such that bulleted lists are uniformly represented by three bullets and paragraphs are uniformly represented by an initial indented line, three full lines, and a last partial line of text, for example.

In response to rule executor 118A executing one or more rules 110, one or more rendering schemas may be implemented. Simulator/renderer 120A may then simulate each content type identified within the viewable area of the document according to a selected rendering schema. Thumbnail generator 122A may combine the content type simulations based on the document structure to simulate a thumbnail preview of the document.

Similar to thumbnail simulator 106A, thumbnail simulator 106B may include an optional structure determiner 112B. Optional structure determiner 112B may determine a file structure (e.g., document structure) in a similar manner as structure determiner 112A. However, as noted above, thumbnail simulator 106B is executed on one or more servers (e.g., associated with a service). In order to determine a document structure for an uploaded file, the service may be required to run an instance of a client application to retrieve and load the file. To avoid additional costs in terms of time and resources, it may be preferable for structure determiner 112A to determine a document structure while a file is open on the client.

Thumbnail simulator 106B may also comprise an optional content type identifier 114B for identifying various content types within a viewable area of a document. However, similar to determining a document structure, in order to identify content types within the viewable area of a document, the service may be required to run an instance of a client application to retrieve and load the file. To avoid additional costs in terms of time and resources, it may be preferable for content type identifier 114A to identify content types while the file is open on the client.

Thumbnail simulator 106B may also include a structure reader 128. The structure reader 128 may receive a package of information (e.g., a document map) regarding a document structure, a viewable area, one or more content types, content type arrangement, and the like, with an uploaded file. The package may be associated with the file (e.g., as metadata) or provided as an alternate stream associated with the file, for example. In this case, structure reader 128 may retrieve the document map from the package without needing to run an instance of a client application or load the document.

Rule executor 118B may retrieve rules 110 from a database 130 via network 124. In other aspects, rules 110 may be retrieved locally on the server 126 (not shown) Similar to rule executor 118A, rule executor 118B may execute rules 110 to implement various rendering schemas for generating simulated thumbnail previews.

In response to rule executor 118B executing one or more rules 110, one or more rendering schemas may be implemented. Simulator/renderer 120B may then simulate each content type identified within the viewable area of the document according to a selected rendering schema. Thumbnail generator 122B may combine the content type simulations based on the document structure to simulate a thumbnail preview of the document.

As should be appreciated, the various devices, components, etc., described with respect to FIG. 1 are not intended to limit the systems and methods to the particular components described. Accordingly, additional topology configurations may be used to practice the methods and systems herein and/or some components described may be excluded without departing from the methods and systems disclosed herein.

Figure 2A:
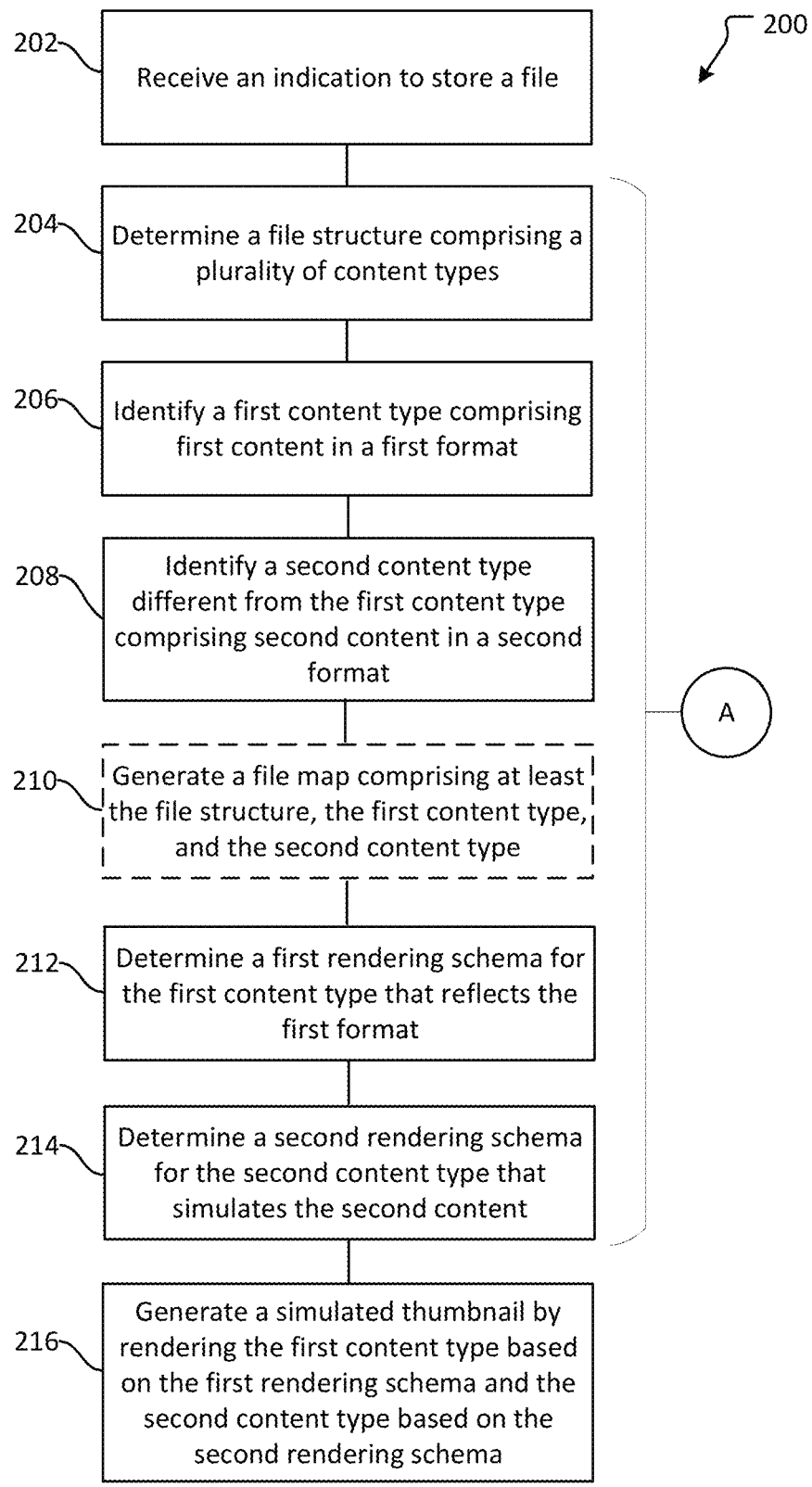
FIGS. 2A-2B illustrate an example method for simulating thumbnail previews in accordance with aspects of the present disclosure.
Figure 2B:
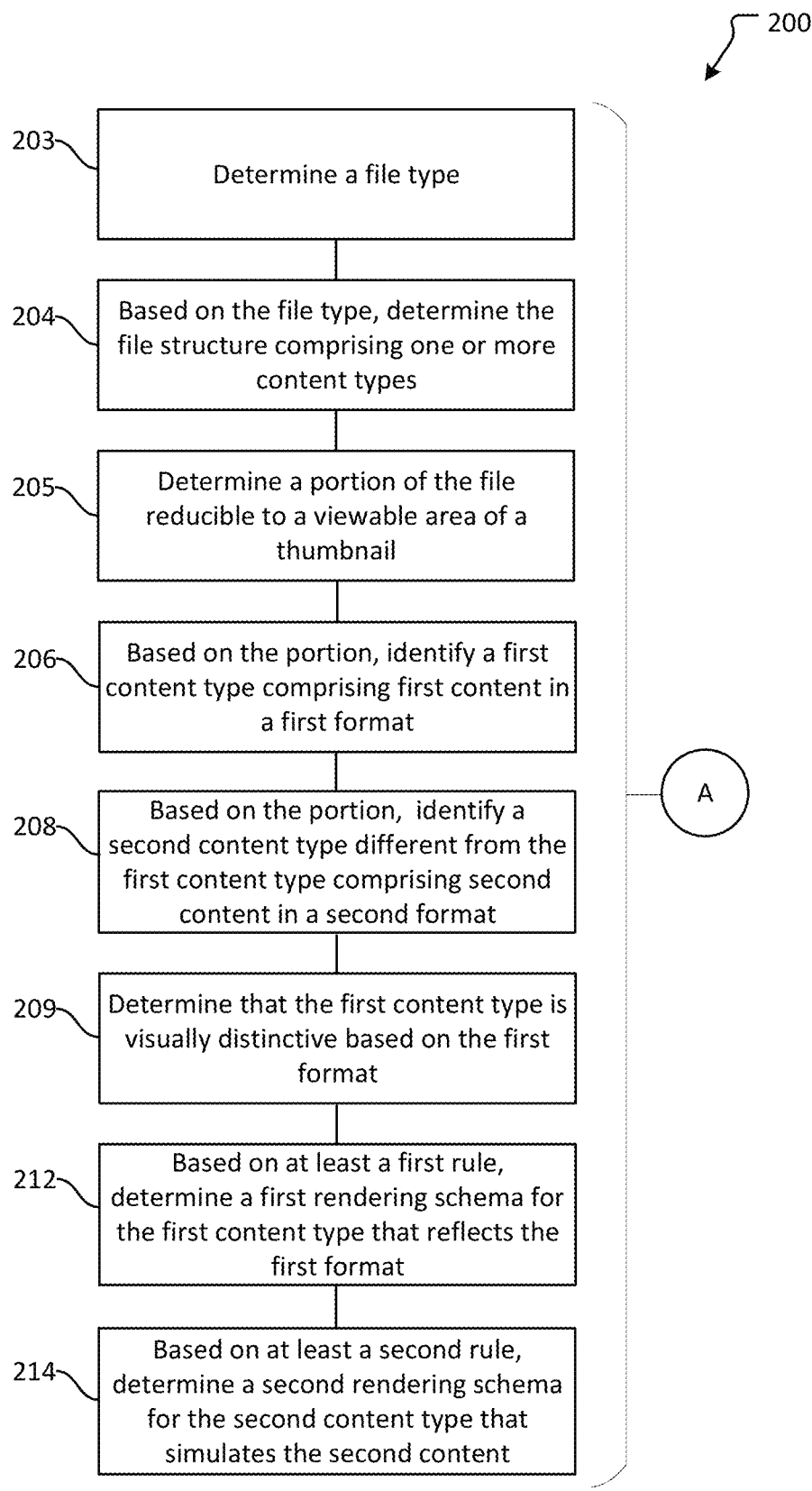

FIGS. 2A-2B illustrate an example method for simulating thumbnail previews in accordance with aspects of the present disclosure. In aspects, FIG. 2B provides an example method with additional operations and details associated with operations 204-212 of FIG. 2A, as indicated by the letter "A."

A general order of the operations for the method 200 is shown in FIGS. 2A-2B. The method 200 may include more or fewer steps or may arrange the order of the steps differently than those shown in FIGS. 2A-2B. The method 200 can be executed as a set of computer-executable instructions executed by a computer system and encoded or stored on a computer readable medium. Further, the method 200 can be performed by gates or circuits associated with a processor, an ASIC, an FPGA, a SOC or other hardware device. Hereinafter, the method 200 shall be explained with reference to the systems, components, devices, modules, software, data structures, data characteristic representations, signaling diagrams, methods, etc., described in conjunction with FIGS. 1, and 3-11B.

At receive operation 202, an indication to store a file may be received. The indication may be in many forms, such as closing a file, initiating a save function, initiating an upload function, initiating automatic save function during file authoring, and the like. In some aspects, the file may be a document and the document may be newly created or subsequently edited when the indication to store the document is received.

At determine structure operation 204, a file structure may be determined. The file structure may be determined on a client device or a server. A client may determine the file structure while the file is open, whereas a server may run an instance of a client application to load the file before determining the file structure. In aspects, the file may be a document and the file structure may comprise information regarding a portion of the document that, when reduced, corresponds to a viewable area on a thumbnail of fixed size. Such structural information may include slide delineations, page delineations, paragraph delineations, line delineations, character delineations, spreadsheet row/column/cell delineations, or the like. In some cases, the file may be parsed to identify the file structure; in other cases, structural information may be retrieved from metadata or an alternative stream associated with the file. In aspects, a file structure (or document structure) may specify a plurality of content types within the portion of the document corresponding to the viewable area. Content types may refer to document elements such as a title, one or more section headers, one or more images, one or more graphs or tables, bulleted or numbered lists, unformatted (or minimally formatted) text, hyperlinks, or the like. In further aspects, the file structure may indicate an arrangement of content types within the viewable area.

At first identify operation 206, a first content type may be identified from among the plurality of content types. The first content type may comprise first content in a first format. In aspects, content types may comprise content having different types of formatting, such as text formatting (e.g., bolding, italics, underlining, font size, font color, and the like), structural formatting (e.g., bulleted lists, numbered lists, text indentations, and the like), and object formatting (e.g., image colors, table grids and dimensions, and the like).

At second identify operation 208, a second content type may be identified from among the plurality of content types. The second content type may be different from the first content type and may comprise second content in a second format.

At optional generate operation 210, a client device may generate a file map. The file map may be lightweight and may comprise the file structure, the first content type, the second content type, and an arrangement of the first content type and the second content type, for example. Unlike large image captures, the lightweight file map is easily uploaded with the file for use by a service in simulating a thumbnail preview. In this way, the service need not run an instance of a client application or a client renderer to load the file and generate the thumbnail. The file map may accompany the file as metadata, for example, or may be uploaded to the service as an alternate stream associated with the file. Furthermore, based on the rules, the thumbnail preview may be consistently generated by the service based on the file structure and content types retrieved from the file map.

At determine first rendering operation 212, a first rendering schema for the first content type may be determined. As described above, rendering schemas may be of many different types. For instance, rendering schemas may range from relatively accurate simulated representations of a document (e.g., a "pseudo capture"), to pre-generated proxy thumbnails that represent generalized styles of a document type (e.g., a "proxy simulation"), to pre-generated proxies of content types that may be combined to create a simulated thumbnail for a document (e.g., a "proxy chunk simulation"). In aspects, rendering schemas may be provided that reflect the formatting associated with a content type. For example, a rendering schema for a bulleted list may reflect the bulleted format, but may render the bulleted text with masking or random content. Similarly, a rendering schema for bolded text may replace the text with masking having a darker hue and a rendering schema for header text may replace the text with masking in a larger size, for example. In aspects, where formatting distinguishes the content type from other content types, a rendering schema that reflects the formatting may be determined.

At determine second rendering operation 214, a second rendering schema for the second content type may be determined. As described above, rendering schemas may be of many different types. In some cases, rendering schemas may be provided that simulate content associated with a content type. For example, in place of minimally formatted text, a rendering schema may replace the text with masking or random content. In aspects, where formatting does not distinguish a content type from other content types, the rendering schema may simply simulate the content associated with the content type.

At generate operation 216, a simulated thumbnail of the file may be generated. Based on the first rendering schema for the first content type and the second rendering schema for the second content type, the file may be recognizable from the simulated thumbnail. For instance, the file may be recognized from the simulated thumbnail without opening the file.

FIG. 2B provides an example method for simulating thumbnail previews with additional operations and details associated with operations 204-214 of FIG. 2A.

At determine type operation 203, a file type of the file may be determined. File types may include audio file types, image file types, document file types, video file types, and the like. In particular, document file types may include a word processing file type, a spreadsheet file type, a notebook file type, a presentation file type, and the like.

At determine structure operation 204 (as with FIG. 2A), a file structure may be determined. The file structure may be determined based on the file type. For instance, for a presentation file type, at a high level, the file structure may involve one or more slide delineations; whereas for a document file type, the file structure may involve one or more page delineations (or comparable line delineations). In some cases, the file may be parsed to identify the file structure; in other cases, structural information may be retrieved from metadata or an alternative stream associated with the file. Structural information regarding a file may include slide delineations, page delineations, paragraph delineations, line delineations, character delineations, spreadsheet row/column/cell delineations, or the like. A file structure (or document structure) may also specify a plurality of content types and an arrangement of content types within the file. Content types may refer to document elements such as a title, one or more section headers, one or more images, one or more graphs or tables, bulleted or numbered lists, unformatted (or minimally formatted) text, hyperlinks, or the like.

At determine portion operation 205, a portion of the document may be determined that, when reduced, corresponds to a viewable area on a thumbnail of fixed size. In aspects, based on the file structure (or document structure), a plurality of content types may be arranged within the portion of the document corresponding to the viewable area.

At first identify operation 206 (as with FIG. 2A), a first content type may be identified from among the plurality of content types within the portion of the file corresponding to the viewable area. The first content type may comprise first content in a first format.

At second identify operation 208 (as with FIG. 2A), a second content type may be identified from among the plurality of content types. The second content type may be different from the first content type and may comprise second content in a second format.

At determination operation 209, it may be determined that the first content type is visually distinctive based on the first format. As noted above, when minimized for rendering in a thumbnail, some formatting distinguishes content types from other content types, whereas other formatting does not. As an example, minimally formatted text may comprise a degree of formatting (such as font size, italics, or underlining); however, when minimized, the minimally formatted text is not intelligible or distinguishable from other textual content. In contrast, bolded text, bulleted lists, images, tables, hyperlinks, and the like, may be distinguishable from other content types even when minimized. In aspects, heuristics may be used to determine that the first content type is visually distinctive based on the first format. In further aspects, the heuristics may be based on training data regarding document recognition based on image-based thumbnails and/or simulated thumbnails, as described herein.

At determine first rendering operation 212 (as with FIG. 2A), a first rendering schema for the first content type may be determined. In aspects, the first rendering schema may be determined based on at least a first rule. As noted above, the present disclosure implements an algorithmic approach to generating simulated thumbnail previews. In aspects, the algorithmic approach may involve evaluating a file structure and executing rules for implementing one or more rendering schemas, including rendering schemas associated with a pseudo capture, a proxy simulation, or a proxy chunk simulation, for instance. The rules may specify conditions for implementing different rendering schemas to simulate different content types. In aspects, a condition may relate to a particular file type, file structure, content type, or the like. Based on a condition, a particular rendering schema may be determined that reflects the formatting associated with a content type. For example, a rendering schema for a bulleted list may reflect the bulleted format, but may render the bulleted text with masking or random content. Similarly, a rendering schema for bolded text may replace the text with masking having a darker hue and a rendering schema for header text may replace the text with masking in a larger size, for example. In aspects, where formatting distinguishes the content type from other content types, a rendering schema that reflects the formatting may be determined.

At determine second rendering operation 214 (as with FIG. 2A), a second rendering schema for the second content type may be determined. As described above, rendering schemas may be of many different types. In some cases, rendering schemas may be provided that simulate content associated with a content type. For example, in place of minimally formatted text, a rendering schema may replace the text with masking or random content. In aspects, where formatting does not distinguish a content type from other content types, the rendering schema may simply simulate the content associated with the content type.

As should be appreciated, operations 202-216 are described for purposes of illustrating the present methods and systems and are not intended to limit the disclosure to a particular sequence of steps, e.g., steps may be performed in different order, an additional steps may be performed, and disclosed steps may be excluded without departing from the present disclosure.

Figure 3:
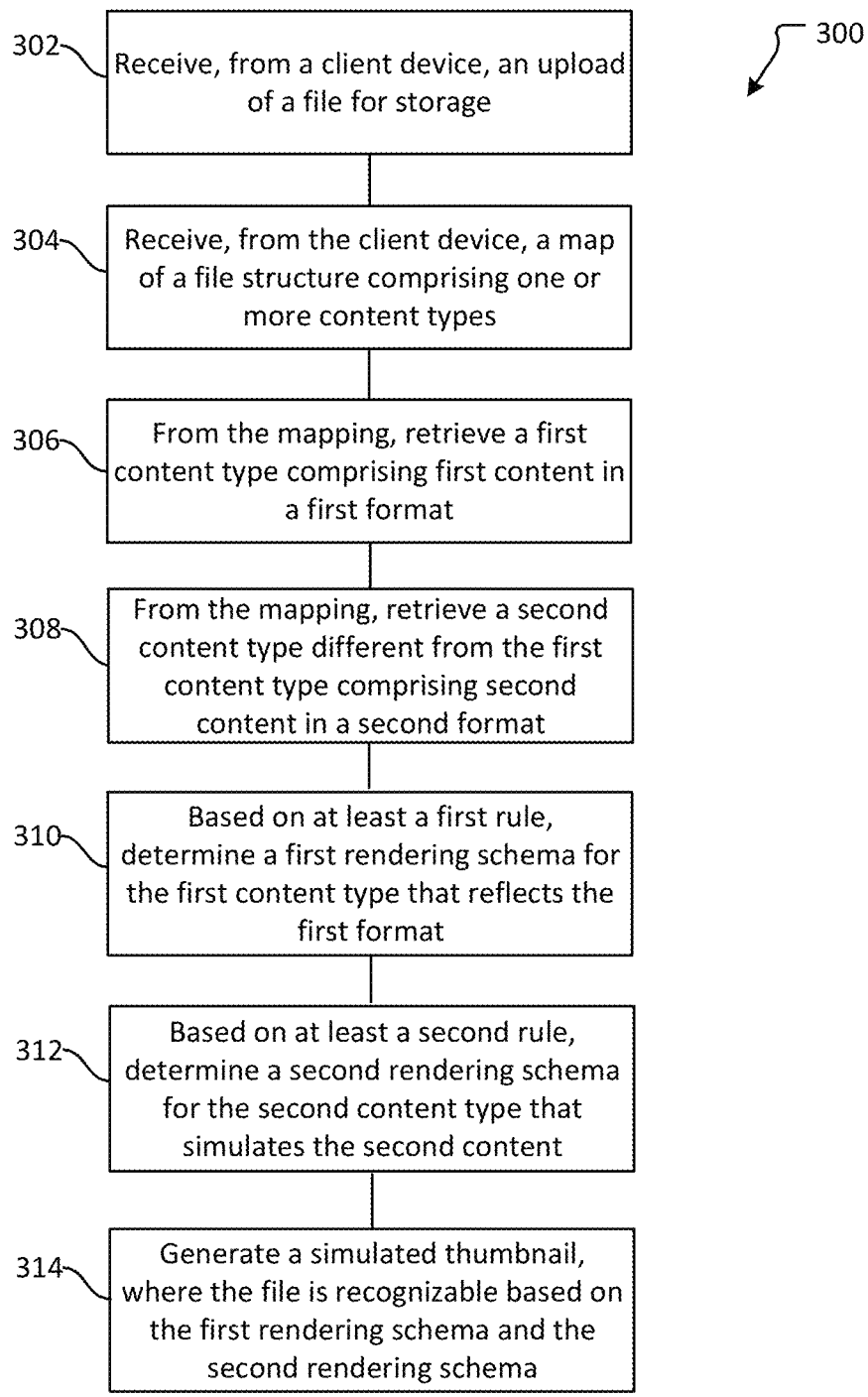
FIG. 3 illustrates an example method for simulating thumbnail previews on a service in accordance with aspects of the present disclosure.

FIG. 3 illustrates an example method for simulating thumbnail previews on a service in accordance with aspects of the present disclosure.

A general order of the operations for the method 300 is shown in FIG. 3. The method 300 may include more or fewer steps or may arrange the order of the steps differently than those shown in FIG. 3. The method 300 can be executed as a set of computer-executable instructions executed by a computer system and encoded or stored on a computer readable medium. Further, the method 300 can be performed by gates or circuits associated with a processor, an ASIC, an FPGA, a SOC or other hardware device. Hereinafter, the method 300 shall be explained with reference to the systems, components, devices, modules, software, data structures, data characteristic representations, signaling diagrams, methods, etc., described in conjunction with FIGS. 1-2B and 4-11B.

At receive upload operation 302, an upload of a file for storage may be received from a client device. In aspects, the upload of the file may be received by a service. The file may be a document and the document may be newly created or subsequently edited when the indication to upload the document is received.

At receive map operation 304, a map of a file structure for the file may be received. In aspects, the file structure may be determined by the client device while the file is open. When the file is a document, the file structure may comprise information regarding a portion of the document that, when reduced, corresponds to a viewable area on a thumbnail of fixed size. Such structural information may include slide delineations, page delineations, paragraph delineations, line delineations, character delineations, spreadsheet row/column/cell delineations, or the like. Additionally, a file structure (or document structure) may specify a plurality of content types and an arrangement of the content types within the portion of the document corresponding to the viewable area. The client may also create a lightweight mapping of the file structure (e.g., "file map"). Unlike large image captures, the lightweight mapping is easily uploaded with the file for use by the service in simulating a thumbnail preview of the file. The lightweight mapping may accompany the file as metadata, for example, or may be uploaded to the service as an alternate stream associated with the document. In this way, the service need not run an instance of a client application to load the file and generate the thumbnail.

At first retrieve operation 306, a first content type may be retrieved from among the plurality of content types identified in the file map. The first content type may comprise first content in a first format. In aspects, content types may comprise content having different types of formatting, such as text formatting (e.g., bolding, italics, underlining, font size, font color, and the like), structural formatting (e.g., bulleted lists, numbered lists, text indentations, and the like), and object formatting (e.g., image colors, table grids and dimensions, and the like).

At second retrieve operation 308, a second content type may be retrieved from among the plurality of content types identified in the file map. The second content type may be different from the first content type and may comprise second content in a second format.

At determine first rendering operation 310, a first rendering schema for the first content type may be determined. In aspects, the first rendering schema may be determined based on at least a first rule. As noted above, the present disclosure implements an algorithmic approach to generating simulated thumbnail previews. In aspects, the algorithmic approach may involve evaluating a file structure and executing rules for implementing one or more rendering schemas, including rendering schemas associated with a pseudo capture, a proxy simulation, or a proxy chunk simulation, for instance. The rules may specify conditions for implementing different rendering schemas to simulate different content types. Based on a condition, a particular rendering schema may be determined that reflects the formatting associated with a content type. For example, a rendering schema for a bulleted list may reflect the bulleted format, but may render the bulleted text with masking or random content. Similarly, a rendering schema for bolded text may replace the text with masking having a darker hue and a rendering schema for header text may replace the text with masking in a larger size, for example. In aspects, where formatting distinguishes the content type from other content types, a rendering schema that reflects the formatting may be determined.

At determine second rendering operation 312, a second rendering schema for the second content type may be determined. As described above, rendering schemas may be of many different types. In some cases, rendering schemas may be provided that simulate content associated with a content type. For example, in place of minimally formatted text, a rendering schema may replace the text with masking or random content. In aspects, where formatting does not distinguish a content type from other content types, the rendering schema may simply simulate the content associated with the content type.

At generate operation 314, a simulated thumbnail of the file may be generated. Based on the first rendering schema for the first content type and the second rendering schema for the second content type, the file may be recognizable from the simulated thumbnail. For instance, the file may be recognized from the simulated thumbnail without opening the file.

As should be appreciated, operations 302-314 are described for purposes of illustrating the present methods and systems and are not intended to limit the disclosure to a particular sequence of steps, e.g., steps may be performed in different order, an additional steps may be performed, and disclosed steps may be excluded without departing from the present disclosure.

Figure 4:
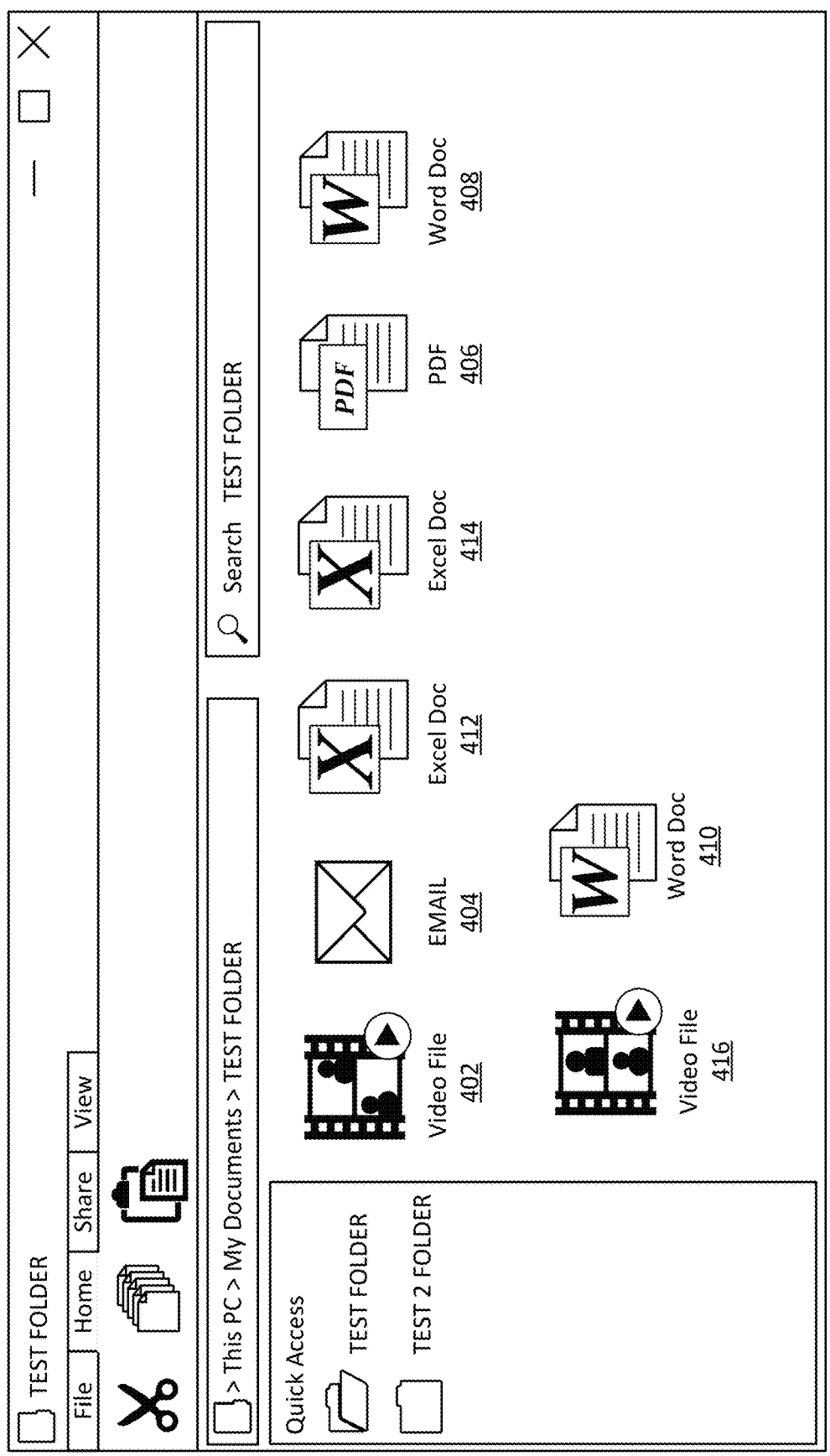
FIG. 4 depicts a grid view of a files with file icons or image-based thumbnails in accordance with examples of the present disclosure.

FIG. 4 depicts a grid view of a files with file icons or image-based thumbnails in accordance with examples of the present disclosure. As illustrated by FIG. 4, a file manager interface 400 illustrates various files stored in a Test Folder. The files include a video file 402, an email file 404, a PDF file 406, a Word Doc 408, a Word Doc 410, an Excel Doc 412, an Excel Doc 414, and a video file 416. Based on image-based thumbnails, video file 402 is distinguishable from video file 416, as well as the other files in the Test Folder. However, as described further herein, thumbnail previews based on image captures are costly and time consuming to generate. Also illustrated are email file 404 and PDF file 406, which are distinguishable from the other files in the Test Folder based on file icons. Thus, image-based thumbnails and some file icons may distinguish files and provide some assistance in document recognition. In contrast, the "W" file icon is of little use in distinguishing Word® Doc 408 from Word® Doc 410. Nor is the "X" file icon of use in distinguishing Excel® Doc 412 from Excel® Doc 414. As described herein, methods and systems for generating simulated thumbnails that enable better document recognition than file icons while also providing a lightweight solution over image-based thumbnails.

Figure 5:
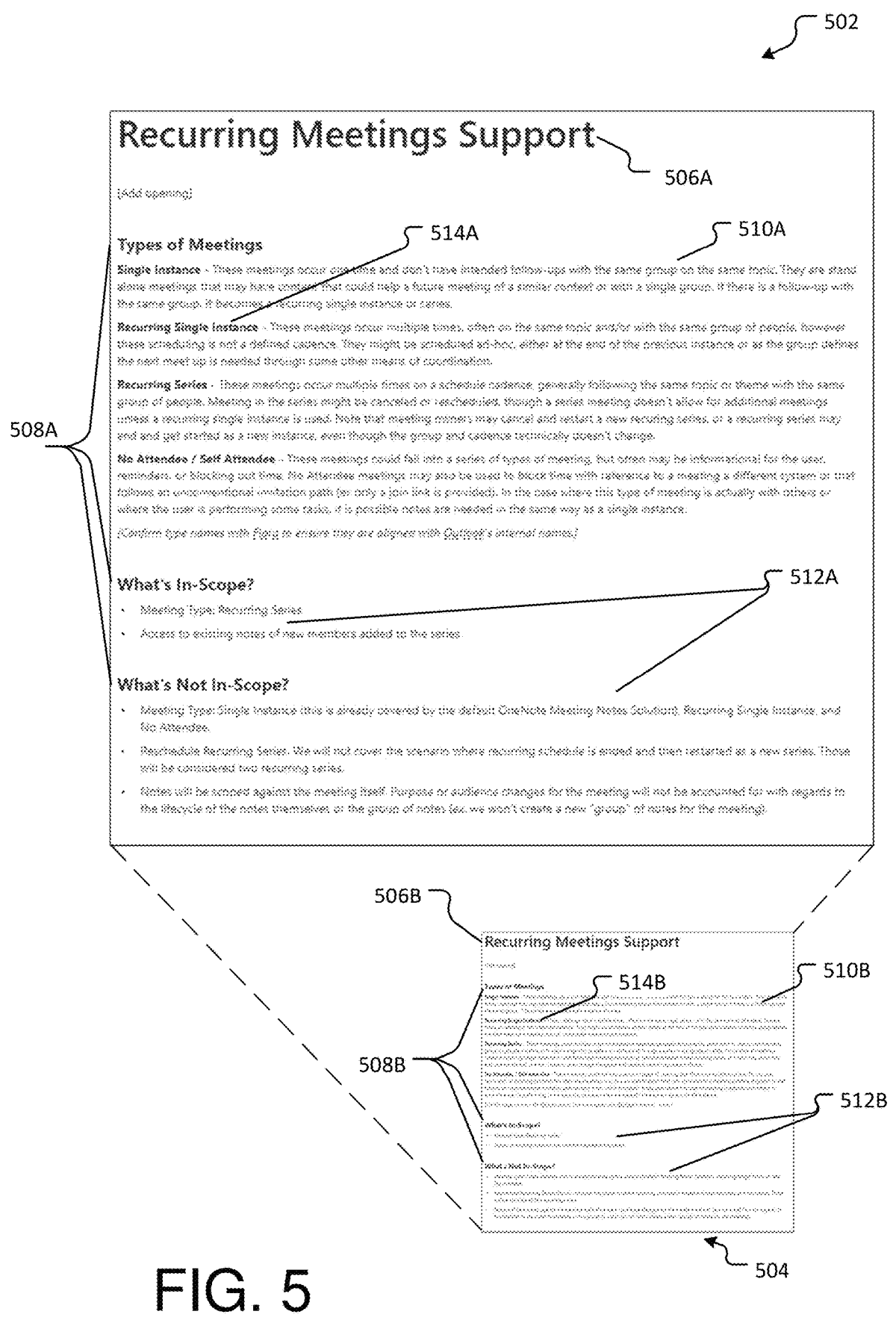

FIG. 5 depicts an example of a top portion of a document and a corresponding image-based thumbnail in accordance with examples of the present disclosure.

As illustrated, a document 502 is illustrated. Document 502 may be a word processing file type. In aspects, a top portion of document 502, when minimized, corresponds to a viewable area of thumbnail preview 504. Document 502 includes a number of content types, such as a title 506A (H1 content), section headers 508A (H2 content), minimally formatted text 510A, bulleted text 512A, and bolded text 514A. In the viewable area of thumbnail preview 504, some of these content items are readable or distinguishable (e.g., based on formatting), whereas other content types are not. For instance, in thumbnail preview 504, title 506B is readable as "Recurring Meeting Support," and is distinguishable based on being separate from other text and having enlarged font and bolding. Additionally, section headers 508B are somewhat readable and are distinguishable based on being separate from other text and having bolding. Bulleted text 512B is not readable but is distinguishable based on bulleting. While bolded text 514B is not readable, it is distinguishable based on bolding. Finally, minimally formatted text 510B is not readable or distinguishable based on formatting. Thus, even though thumbnail preview 504 is based on an image capture of the top portion of document 502, there is minimal readable text and it is likely that recognition of the document would be based on the title and the document structure, including formatting, different content types, and content type arrangement.

FIGS. 6A-6D depict examples of simulated thumbnail previews generated based on different rendering schemas in accordance with aspects of the present disclosure.

Figure 6A:
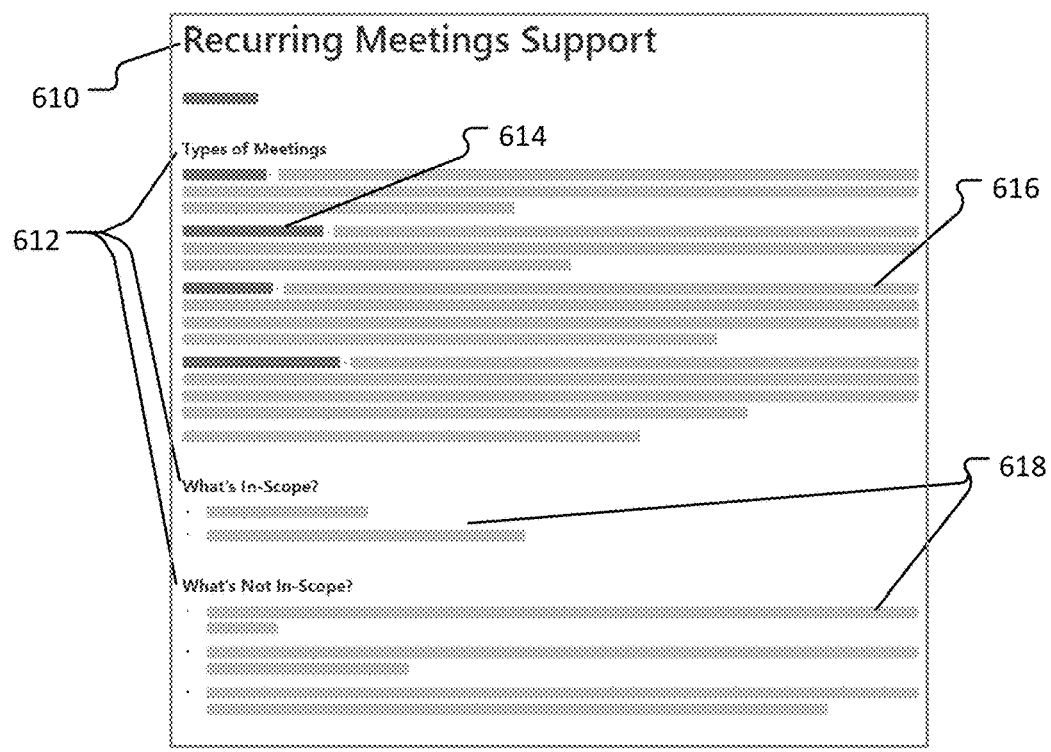
FIGS. 6A-6D depict examples of simulated thumbnail previews generated based on different rendering schemas in accordance with aspects of the present disclosure.

FIG. 6A depicts a first example of a simulated thumbnail 602 generated by a partial-mask rendering schema. Partial masking may include a number of different examples in which some content is rendered with actual text and other content is masked. In this example, text that would likely be readable in an image-based thumbnail is rendered as actual text, whereas unreadable text is masked. Distinguishing formatting such as bolding is maintained by providing masking in a darker hue. Although bulleted text is masked, the distinguishing layout is maintained with bulleted formatting. Thus, as illustrated by FIG. 6A, title 610 is rendered as actual text with enlarged font and bolding. Section headers 612 are also rendered as actual text with (less) enlarged font and bolding. On the other hand, bolded text (e.g., bolded text 514A of FIG. 5) is rendered in dark masking 614 and minimally formatted text (e.g., minimally formatted text 510A of FIG. 5) is rendered in light masking 616. Bulleted text (e.g., bulleted text 512A of FIG. 5) is rendered in bulleted light masking 618.

Figure 6B:
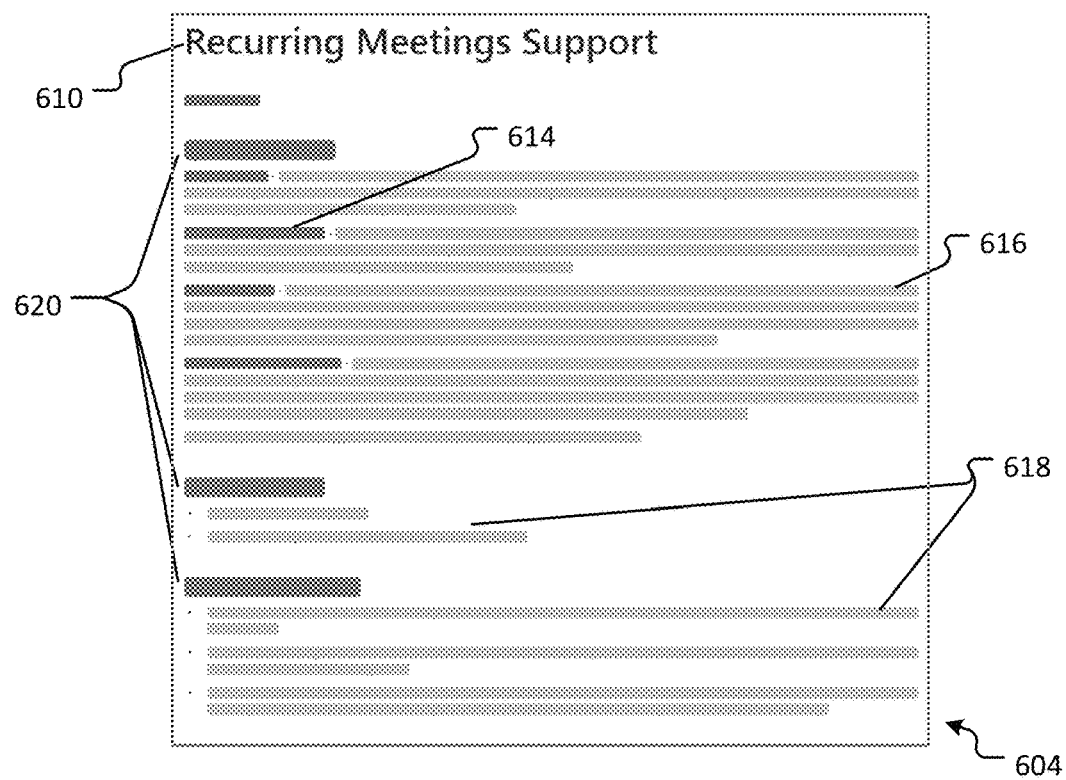

FIG. 6B depicts a second example of a simulated thumbnail 604 generated by a partial-mask rendering schema. In this example, significant text (such as the title 610) is rendered as actual text, whereas remaining text is masked. Distinguishing formatting such as bolding is maintained by providing masking in a darker hue. Although bulleted text is masked, the distinguishing layout is maintained with bulleted formatting. Thus, as illustrated by FIG. 6B, title 610 is rendered as actual text with enlarged font and bolding. In this example, section headers (e.g., second headers 508A of FIG. 5) are rendered with enlarged dark masking 620 rather than actual text. Similar to FIG. 6A, bolded text (e.g., bolded text 514A of FIG. 5) is rendered in dark masking 614 and minimally formatted text (e.g., minimally formatted text 510A of FIG. 5) is rendered in light masking 616. Bulleted text (e.g., bulleted text 512A of FIG. 5) is rendered in bulleted light masking 618.

Figure 6C:
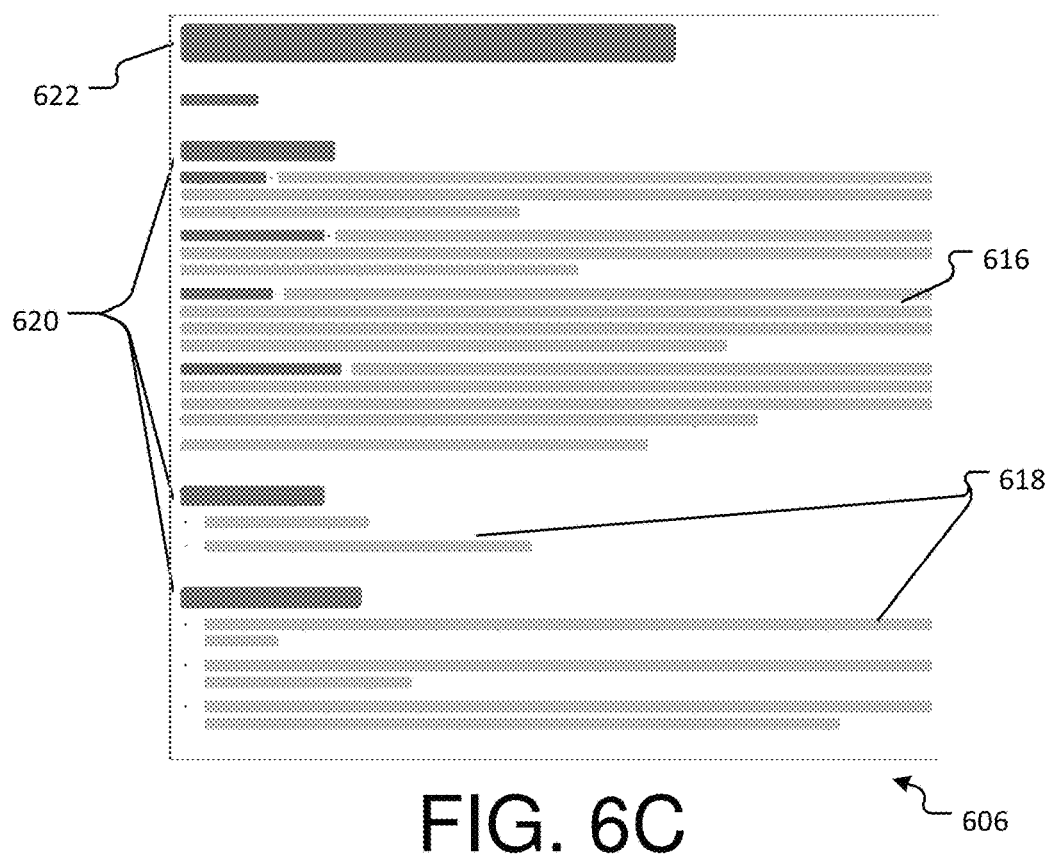

FIG. 6C depicts a third example of a simulated thumbnail 606 generated by a full-mask rendering schema. In this example, all text is masked. Distinguishing formatting such as enlarged font is maintained by increasing the width of the masking. Bolding is maintained by providing masking in a darker hue. Although bulleted text is masked, the distinguishing layout is maintained with bulleted formatting. In this example, as illustrated by FIG. 6C, the title (e.g., title 506 of FIG. 5) is rendered with further enlarged dark masking 622. Similarly, section headers (e.g., second headers 508A of FIG. 5) are rendered with enlarged dark masking 620. Here again, bolded text (e.g., bolded text 514A of FIG. 5) is rendered in dark masking 614 and minimally formatted text (e.g., minimally formatted text 510A of FIG. 5) is rendered in light masking 616. Bulleted text (e.g., bulleted text 512A of FIG. 5) is rendered in bulleted light masking 618.

Figure 6D:
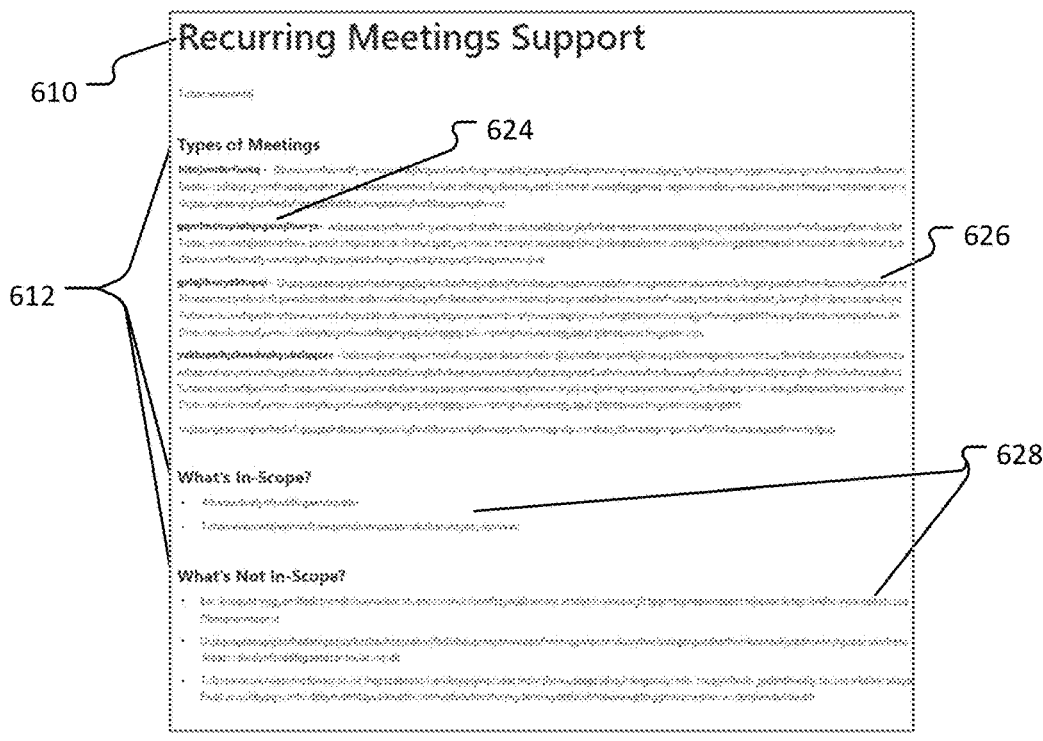

FIG. 6D depicts a fourth example of a simulated thumbnail 608 generated by a partial random (or pseudo) text rendering schema. As detailed above, random (or pseudo) text may refer to rendering random characters organized into various length sets and separated by spaces. Although random content is unintelligible, when minimized, the random content approximates the look of text. Similar to masking, the random content may maintain indications of distinguishing formatting by enlarging characters or rendering the characters in a darker or colored font, for example. As illustrated by FIG. 6D, title 610 is rendered as actual text with enlarged font and bolding. Section headers 612 are also rendered as actual text with (less) enlarged font and bolding. On the other hand, bolded text (e.g., bolded text 514A of FIG. 5) is rendered in dark pseudo text 624 and minimally formatted text (e.g., minimally formatted text 510A of FIG. 5) is rendered in light pseudo text 626. Bulleted text (e.g., bulleted text 512A of FIG. 5) is rendered in bulleted, light pseudo text 628.

Figure 7:
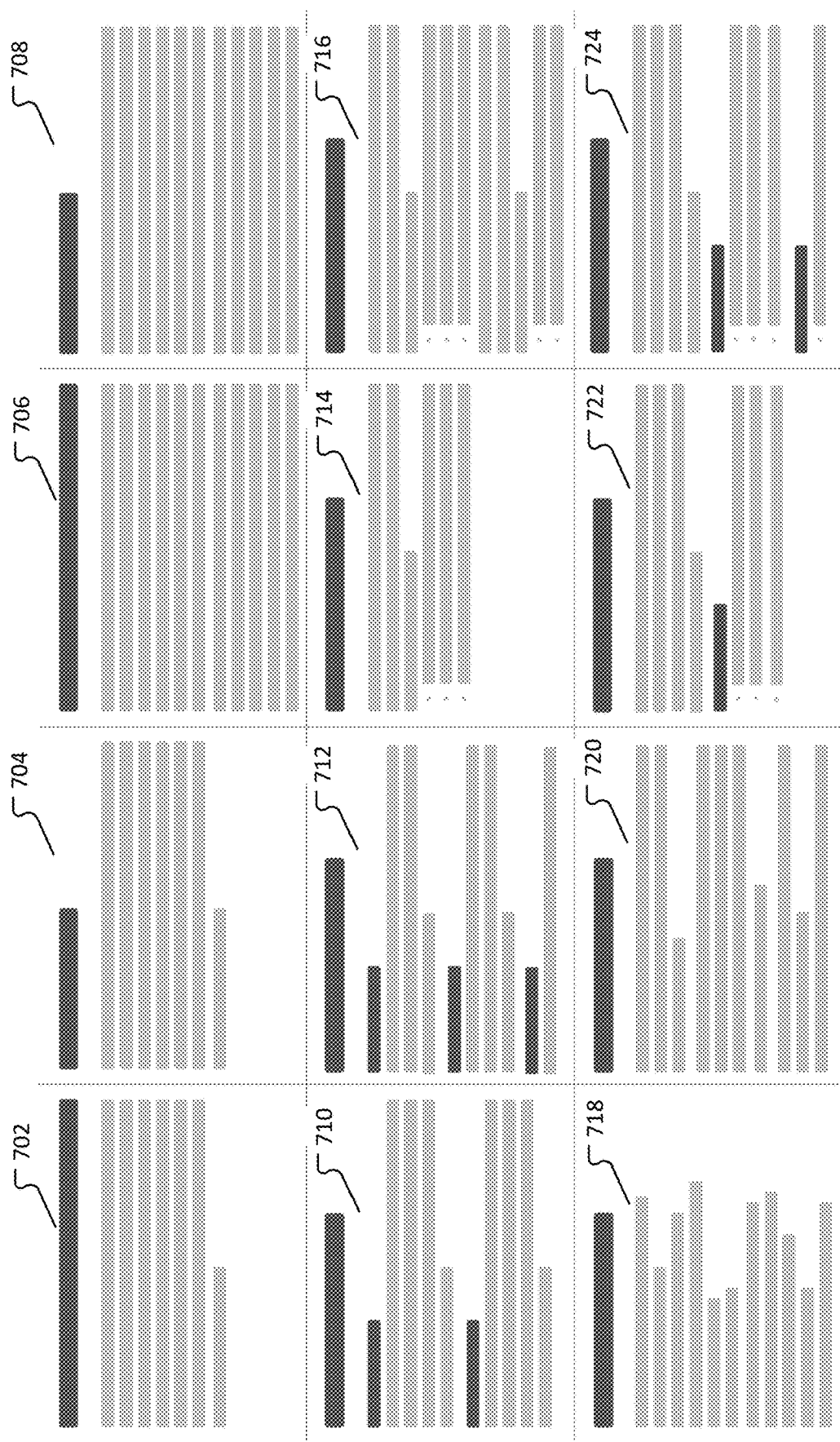
FIG. 7 depicts example proxy thumbnails for use in simulating thumbnail previews in accordance with aspects of the present disclosure.

FIG. 7 depicts example proxy thumbnails for use in simulating thumbnail previews in accordance with aspects of the present disclosure. As detailed above, proxy simulation may involve simulating a thumbnail preview using a fixed set of pre-generated proxy thumbnails representative of characteristic content arrangements for different document types. For instance, with a limited number of elements and a limited amount of space considered against the likelihood of the elements to appear at or near the top of the document, a set of potential document styles may be created and then selected based on elements contained within the top of a particular document. Common proxy thumbnails are illustrated by FIG. 7, including "partial content with full header 702," "partial content with partial header 704," "full content with full header 706," "full content with partial header 708," "two header-based chunks 710," "three header-based chunks 712," "partial content with bullet list 714," "full content with bullet list 716," "full content with individual lines 718," "multiple paragraphs 720," "paragraph and header-based bullet list 722," "paragraph and two header-based bullet lists 724," and the like. In the case of proxy simulation, while the simulated thumbnail may not be a completely accurate representation of a document, it may still provide general differentiation from other documents in a file grid view.

Figure 8A:
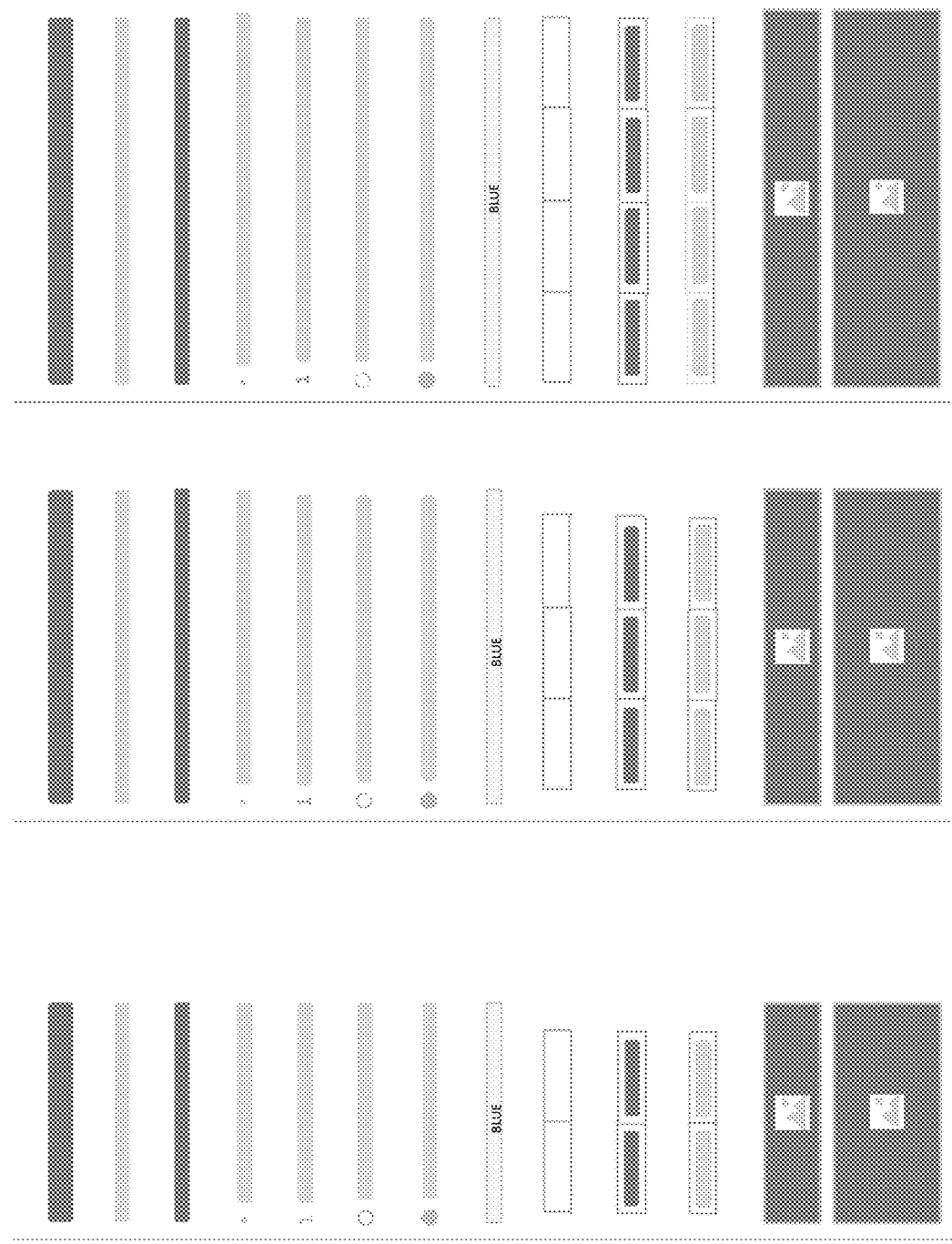
FIG. 8A depicts example proxy chunks for use in simulating thumbnail previews in accordance with aspects of the present disclosure.

FIG. 8A depicts example proxy chunks for use in simulating thumbnail previews in accordance with aspects of the present disclosure. In this example, chunks of general document elements (or content types) may be built and combined based on the structure of a particular document. For instance, if the document includes a series of bulleted lists, each list including three bullets, proxy chunks for a header and three indented bullets may be repeated three times. This would give a more accurate representation of the document than the static proxy thumbnails of FIG. 7. As illustrated in FIG. 8A, proxy chunks for a number of different content types are identified. For instance, title 802 comprises a widened line of dark masking, line of text 804 comprises a line of light masking, header 806 comprises a line of dark masking, bullet 808 comprises a bullet point and a line of light masking, number 810 comprises a number "1" (in this case) and a line of light masking, unchecked item 812 comprises an unfilled circle and a line of light masking, checked item 814 comprises a filled circle and a line of light masking, hyperlink 816 comprises a blue-colored line of masking, table header cell 818 (without content) comprises an empty cell with dark outlining, table header cell 820 (with content) comprises a cell containing dark masking with dark outlining, table cell 822 (with content) comprises a cell containing light masking with light outlining, and image 824 comprises a mask chunk with an image icon in a first height and a second height.

As illustrated, the proxy chunks may be provided in different lengths to reflect different lengths of content. For instance, column A includes proxy chunks having a first length, column B includes proxy chunks having a second longer length, column C includes proxy chunks having a third even longer length, and column D includes proxy chunks having a fourth full length. In this case, title 802A refers to a short title whereas title 802D refers to a full-width title. As should be appreciated, chunks of both different types and different sizes may be used to simulate a thumbnail preview reflecting the structure of a document.

Figure 8B:
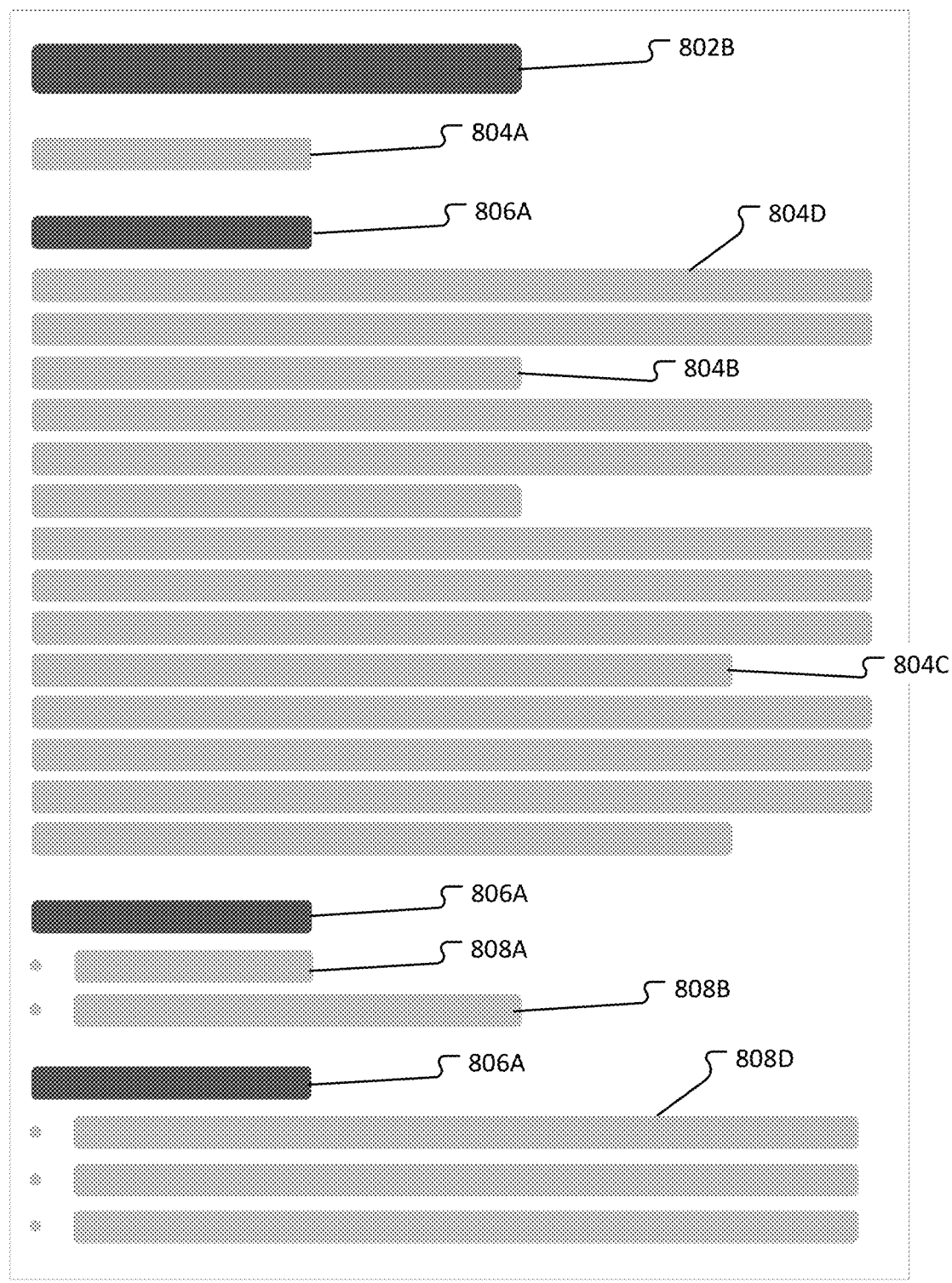
FIG. 8B depicts a simulated thumbnail generated using proxy chunks in accordance with aspects of the present disclosure.

FIG. 8B depicts a simulated thumbnail generated using proxy chunks in accordance with aspects of the present disclosure. Simulated thumbnail 826 comprises a number of different proxy chunks of different lengths that have been combined to simulate a document structure of a document corresponding to simulated thumbnail 826. For instance, title 802B of a second length is provided first, then a line of text 804A of a first length, followed by a first header 806A of the first length. Thereafter, multiple lines of text 804 of different lengths are added, such as line of text 804D of a full length, 804B of the second length, and 804C of the third length. A second header 806A of the first length is followed by a bullet line 808A of the first length and bullet line 808B of the second length. A third header 806A is followed by three bullet lines 808D of a full length. In this way, by combining various proxy chunks a document structure can be approximated to simulate a thumbnail preview.

Figure 9:
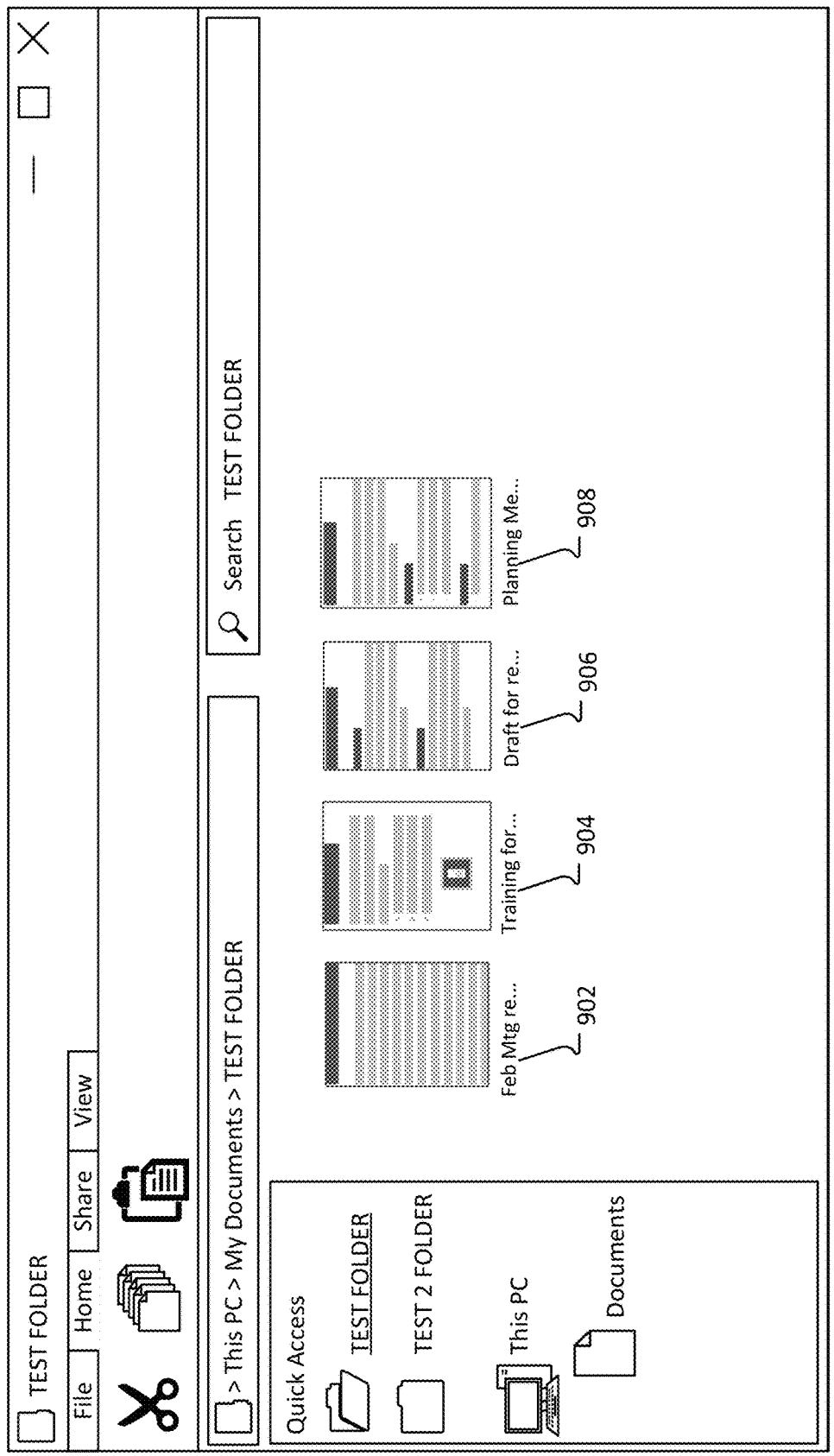
FIG. 9 depicts a grid view of files with simulated thumbnail previews in accordance with examples of the present disclosure.

FIG. 9 depicts a grid view of files with simulated thumbnail previews in accordance with examples of the present disclosure. Similar to FIG. 4, FIG. 9 depicts a file manager interface 900 with various files stored in a Test Folder. However, in this case, each file is represented by a simulated thumbnail preview. For instance, simulated thumbnail preview 902 represents a document with full content and a full title. Simulated thumbnail preview 904 represents a document with partial content, a partial title, a bulleted list, and an image. Simulated thumbnail preview 906 represents a document with a partial title and two header-based chunks. Simulated thumbnail preview 908 represents a document with a partial title, a paragraph, and two header-based bulleted lists. Unlike FIG. 4, although all of the represented documents may be word processing documents, the documents are distinguishable based on the document structure depicted by each simulated thumbnail. In this way, the simulated thumbnail previews enable better document recognition than file icons while also providing a lightweight solution over image-based thumbnails.

Figure 10:
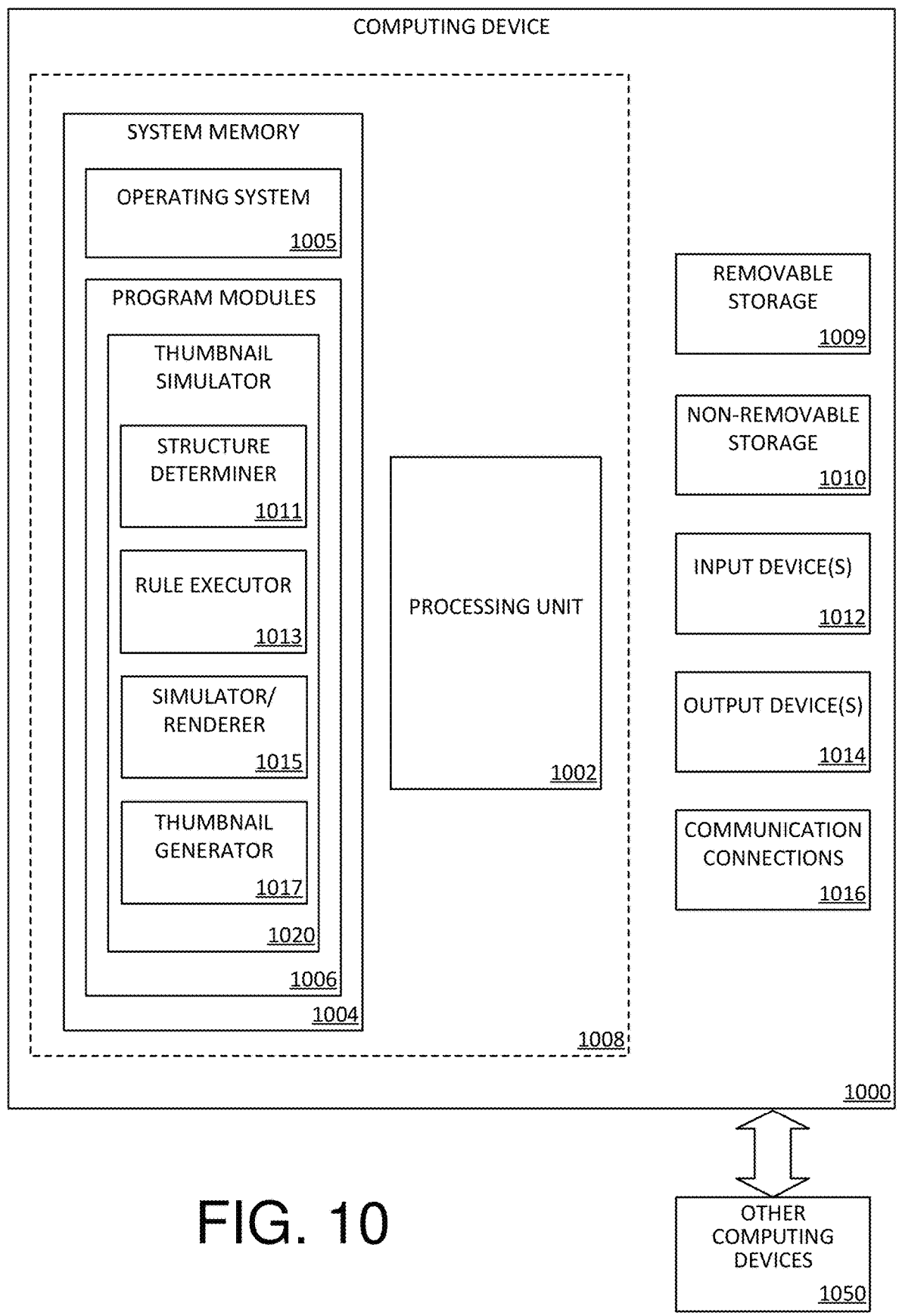
FIG. 10 is a block diagram illustrating physical components (e.g., hardware) of a computing device with which aspects of the disclosure may be practiced.

FIG. 10 is a block diagram illustrating physical components (e.g., hardware) of a computing device 1000 with which aspects of the disclosure may be practiced. The computing device components described below may have computer executable instructions for implementing a thumbnail simulator 1020 on a computing device (e.g., a client or a server), including computer executable instructions for thumbnail simulator 1020 that can be executed to implement the methods disclosed herein. In a basic configuration, the computing device 1000 may include at least one processing unit 1002 and a system memory 1004. Depending on the configuration and type of computing device, the system memory 1004 may comprise, but is not limited to, volatile storage (e.g., random access memory), non-volatile storage (e.g., read-only memory), flash memory, or any combination of such memories. The system memory 1004 may include an operating system 1005 and one or more program modules 1006 suitable for running thumbnail simulator 1020, such as one or more components with reference to FIG. 1 and, in particular, structure determiner 1011 (e.g., corresponding to structure determiner 112, content type identifier 114, and structure mapper 116), rule executor 1013 (e.g., corresponding to rule executor 118), simulator/renderer 1015 (e.g., corresponding to simulator/renderer 120), and/or thumbnail generator 1017 (e.g., corresponding to thumbnail generator 122).

The operating system 1005, for example, may be suitable for controlling the operation of the computing device 1000. Furthermore, embodiments of the disclosure may be practiced in conjunction with a graphics library, other operating systems, or any other application program and is not limited to any particular application or system. This basic configuration is illustrated in FIG. 10 by those components within a dashed line 1008. The computing device 1000 may have additional features or functionality. For example, the computing device 1000 may also include additional data storage devices (removable and/or non-removable) such as, for example, magnetic disks, optical disks, or tape. Such additional storage is illustrated in FIG. 10 by a removable storage device 1009 and a non-removable storage device 1010.

As stated above, a number of program modules and data files may be stored in the system memory 1004. While executing on the processing unit 1002, the program modules 1006 (e.g., thumbnail simulator 1020) may perform processes including, but not limited to, the aspects as described herein. Other program modules that may be used in accordance with aspects of the present disclosure, and in particular for simulating a thumbnail preview, may include structure determiner 1011, rule executor 1013, simulator/renderer 1015, and/or thumbnail generator 1017, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 10 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 1000 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 1000 may also have one or more input device(s) 1012 such as a keyboard, a mouse, a pen, a sound or voice input device, a touch or swipe input device, etc. The computing device 1000 may further support a number of sensors for detecting input associated with the input device(s) 1012 and/or other device conditions. The output device(s) 1014 such as a display, speakers, a printer, etc. may also be included. The aforementioned devices are examples and others may be used. The computing device 1000 may include one or more communication connections 1016 allowing communications with other computing devices 1050. Examples of suitable communication connections 1016 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1004, the removable storage device 1009, and the non-removable storage device 1010 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1000. Any such computer storage media may be part of the computing device 1000. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 11A:
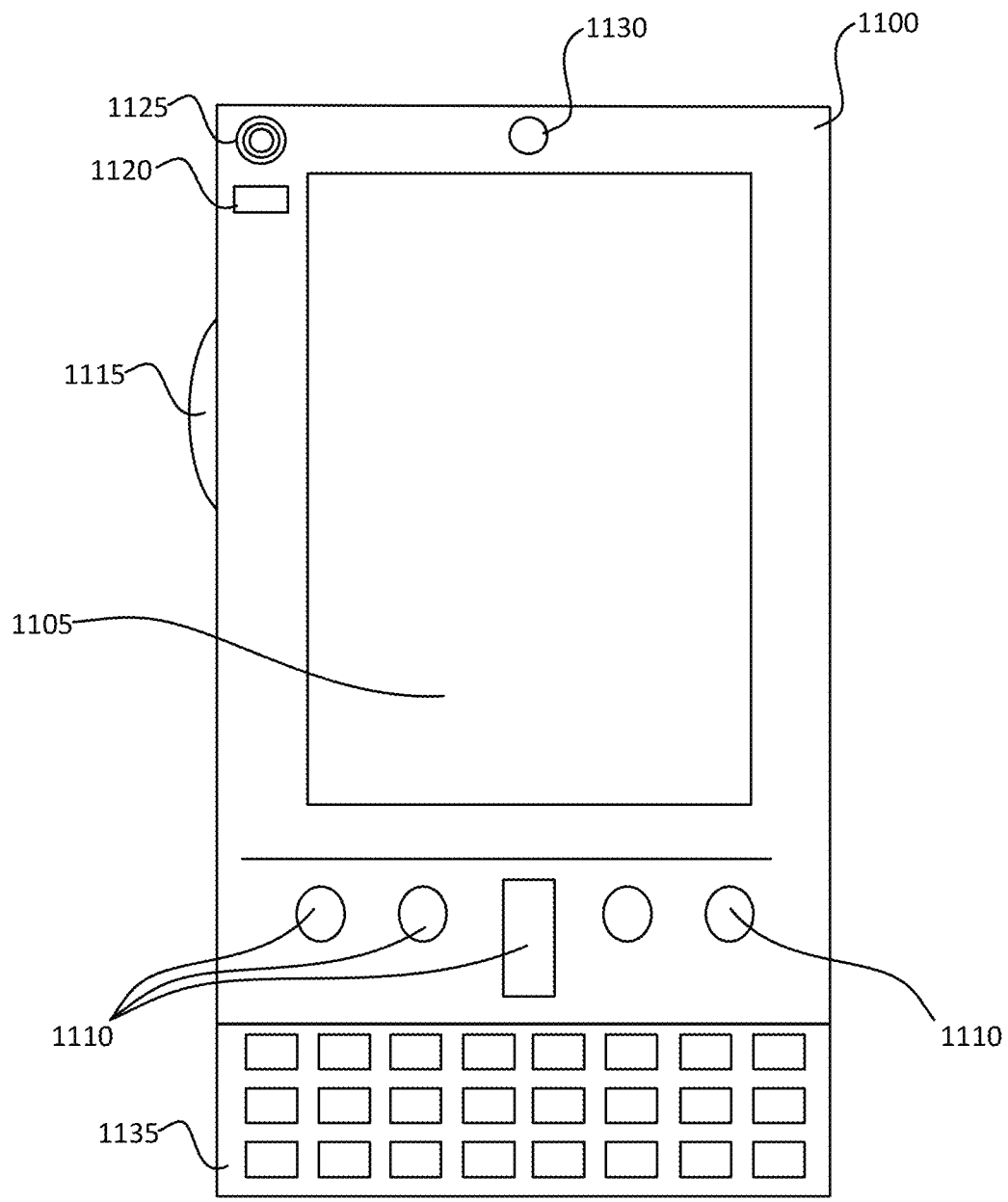
FIG. 11A is a simplified diagram of a mobile computing device with which aspects of the present disclosure may be practiced.
Figure 11B:
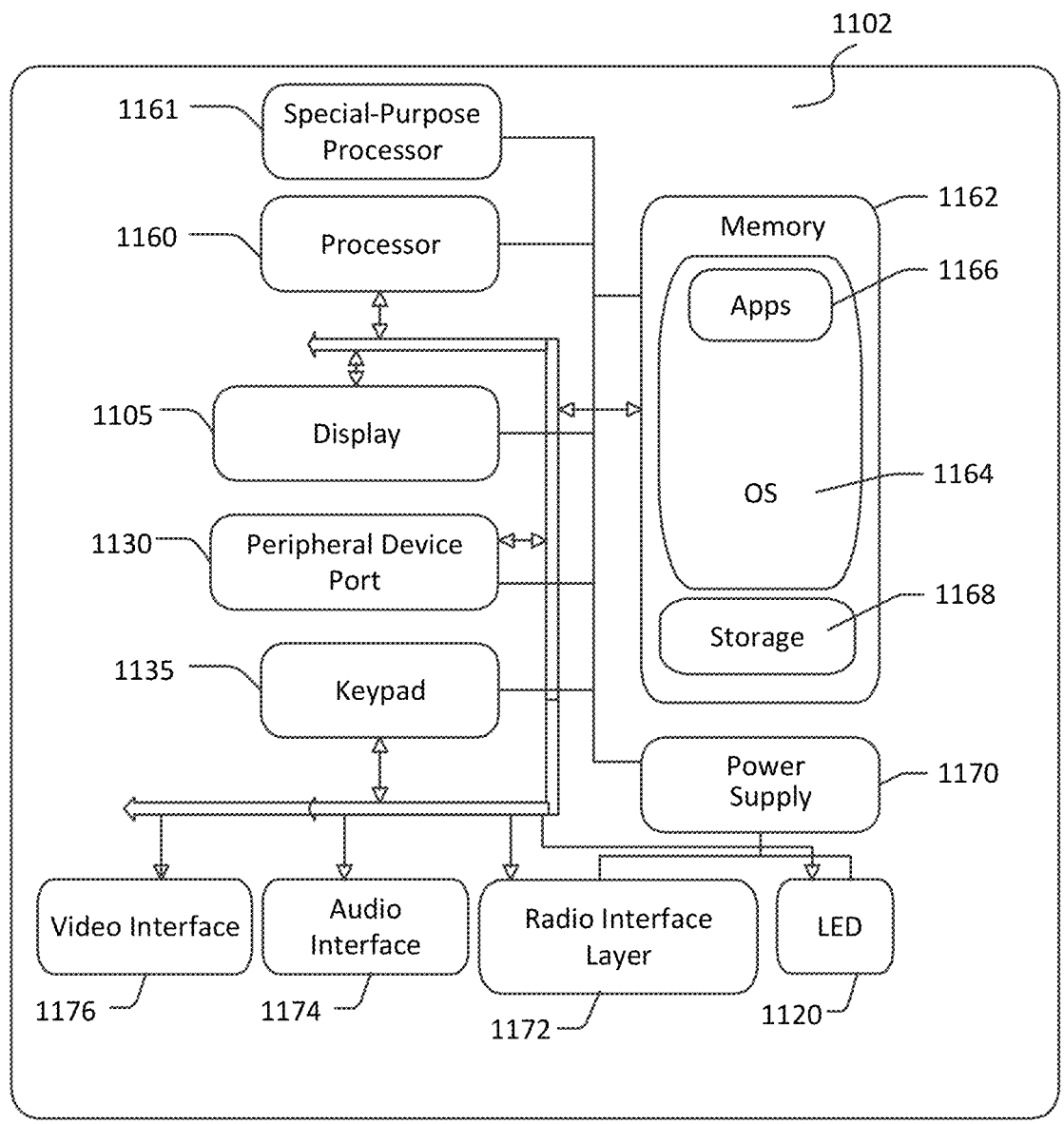
FIG. 11B is another simplified block diagram of a mobile computing device with which aspects of the present disclosure may be practiced.

FIGS. 11A and 11B illustrate a mobile computing device 1100, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 11A, one aspect of a mobile computing device 1100 for implementing the aspects is illustrated. In a basic configuration, the mobile computing device 1100 is a handheld computer having both input elements and output elements. The mobile computing device 1100 typically includes a display 1105 and one or more input buttons 1110 that allow the user to enter information into the mobile computing device 1100. The display 1105 of the mobile computing device 1100 may also function as an input device (e.g., a touch screen display). If included, an optional side input element 1115 allows further user input. The side input element 1115 may be a rotary switch, a button, or any other type of manual input element. In alternative aspects, mobile computing device 1100 may incorporate more or less input elements. For example, the display 1105 may not be a touch screen in some embodiments. In yet another alternative embodiment, the mobile computing device 1100 is a portable phone system, such as a cellular phone. The mobile computing device 1100 may also include an optional keypad 1135. Optional keypad 1135 may be a physical keypad or a "soft" keypad generated on the touch screen display. In various embodiments, the output elements include the display 1105 for showing a graphical user interface (GUI), a visual indicator 1120 (e.g., a light emitting diode), and/or an audio transducer 1125 (e.g., a speaker). In some aspects, the mobile computing device 1100 incorporates a vibration transducer for providing the user with tactile feedback. In yet another aspect, the mobile computing device 1100 incorporates input and/or output ports, such as an audio input (e.g., a microphone jack), an audio output (e.g., a headphone jack), and a video output (e.g., a HDMI port) for sending signals to or receiving signals from an external device.

FIG. 11B is a block diagram illustrating the architecture of one aspect of a mobile computing device. That is, the mobile computing device 1100 can incorporate a system (e.g., an architecture) 1102 to implement some aspects. In one embodiment, the system 1102 is implemented as a "smart phone" capable of running one or more applications (e.g., browser, e-mail, calendaring, contact managers, messaging clients, games, and media clients/players). In some aspects, the system 1102 is integrated as a computing device, such as an integrated personal digital assistant (PDA) and wireless phone.

One or more application programs 1166 may be loaded into the memory 1162 and run on or in association with the operating system 1164. Examples of the application programs include phone dialer programs, e-mail programs, personal information management (PIM) programs, word processing programs, spreadsheet programs, Internet browser programs, messaging programs, and so forth. The system 1102 also includes a non-volatile storage area 1168 within the memory 1162. The non-volatile storage area 1168 may be used to store persistent information that should not be lost if the system 1102 is powered down. The application programs 1166 may use and store information in the non-volatile storage area 1168, such as e-mail or other messages used by an e-mail application, and the like. A synchronization application (not shown) also resides on the system 1102 and is programmed to interact with a corresponding synchronization application resident on a host computer to keep the information stored in the non-volatile storage area 1168 synchronized with corresponding information stored at the host computer. As should be appreciated, other applications may be loaded into the memory 1162 and run on the mobile computing device 1100, including the instructions for providing a thumbnail generator as described herein.

The system 1102 has a power supply 1170, which may be implemented as one or more batteries. The power supply 1170 may further include an external power source, such as an AC adapter or a powered docking cradle that supplements or recharges the batteries.

The system 1102 may also include a radio interface layer 1172 that performs the function of transmitting and receiving radio frequency communications. The radio interface layer 1172 facilitates wireless connectivity between the system 1102 and the "outside world," via a communications carrier or service provider. Transmissions to and from the radio interface layer 1172 are conducted under control of the operating system 1164. In other words, communications received by the radio interface layer 1172 may be disseminated to the application programs 1166 via the operating system 1164, and vice versa.

The visual indicator 1120 may be used to provide visual notifications, and/or an audio interface 1174 may be used for producing audible notifications via an audio transducer 1125 (e.g., audio transducer 1125 illustrated in FIG. 11A). In the illustrated embodiment, the visual indicator 1120 is a light emitting diode (LED) and the audio transducer 1125 may be a speaker. These devices may be directly coupled to the power supply 1170 so that when activated, they remain on for a duration dictated by the notification mechanism even though the processor 1160 and other components might shut down for conserving battery power. The LED may be programmed to remain on indefinitely until the user takes action to indicate the powered-on status of the device. The audio interface 1174 is used to provide audible signals to and receive audible signals from the user. For example, in addition to being coupled to the audio transducer 1125, the audio interface 1174 may also be coupled to a microphone to receive audible input, such as to facilitate a telephone conversation. In accordance with embodiments of the present disclosure, the microphone may also serve as an audio sensor to facilitate control of notifications, as will be described below. The system 1102 may further include a video interface 1176 that enables an operation of peripheral device 1130 (e.g., on-board camera) to record still images, video stream, and the like.

A mobile computing device 1100 implementing the system 1102 may have additional features or functionality. For example, the mobile computing device 1100 may also include additional data storage devices (removable and/or non-removable) such as, magnetic disks, optical disks, or tape. Such additional storage is illustrated in FIG. 11B by the non-volatile storage area 1168.

Data/information generated or captured by the mobile computing device 1100 and stored via the system 1102 may be stored locally on the mobile computing device 1100, as described above, or the data may be stored on any number of storage media that may be accessed by the device via the radio interface layer 1172 or via a wired connection between the mobile computing device 1100 and a separate computing device associated with the mobile computing device 1100, for example, a server computer in a distributed computing network, such as the Internet. As should be appreciated such data/information may be accessed via the mobile computing device 1100 via the radio interface layer 1172 or via a distributed computing network. Similarly, such data/information may be readily transferred between computing devices for storage and use according to well-known data/information transfer and storage means, including electronic mail and collaborative data/information sharing systems.

As should be appreciated, FIGS. 11A and 11B are described for purposes of illustrating the present methods and systems and is not intended to limit the disclosure to a particular sequence of steps or a particular combination of hardware or software components.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, for example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A computer-implemented method for simulating a thumbnail preview, the method comprising:
   receiving an indication to store a document;
   evaluating the document to determine a document structure comprising a plurality of content types;
   determining a portion of the document reducible to a viewable area of a thumbnail preview;
   based on the portion, identifying at least a first content type of the plurality of content types, wherein the first content type comprises first content in a first format;
   based on the portion, identifying at least a second content type of the plurality of content types, wherein the second content type comprises second content in a second format;
   determining a first rendering schema for the first content type that reflects the first format, wherein the first rendering schema specifies a position to render header content according to the document structure;
   determining a second rendering schema for the second content type that simulates the second content, wherein the second rendering schema masks content while maintaining one or more distinguishing features; and
   generating a simulated thumbnail preview of the document by rendering the first content type according to the first rendering schema and the second content type according to the second rendering schema.

2. The computer-implemented method of claim 1, wherein at least the document structure of the document is displayed by the simulated thumbnail preview.

3. The computer-implemented method of claim 1, wherein the first content type is different than the second content type based at least in part on the first format.

4. The computer-implemented method of claim 1, further comprising:
   retrieving one or more rules; and
   executing at least one of the one or more rules to determine the first rendering schema for the first content type that reflects the first format.

5. The computer-implemented method of claim 1, wherein the first content type is visually distinctive based on the first format.

6. The computer-implemented method of claim 5, further comprising:
   using heuristics to determine that the first content type is visually distinctive based on the first format.

7. The computer-implemented method of claim 1, further comprising:
   determining a file type of the document; and
   determining the document structure based at least in part on the file type.

8. The computer-implemented method of claim 7, wherein the file type comprises one of: a word processing file type, a notebook file type, a presentation file type, or a spreadsheet type.

9. The computer-implemented method of claim 1, wherein the first content type is one of: a bulleted list, a numbered list, a checklist, a title, a section header, a table, a hyperlink, bolded text, or an image.

10. The computer-implemented method of claim 1, wherein the second content type is one of: minimally formatted text, underlined text, or italicized text.

11. A client device, comprising:
    at least one processor; and
    at least one memory storing computer-executable instructions that when executed by the at least one processor cause the client device to:
    receive an indication to store a file;
    evaluate the file to determine a file structure comprising a plurality of content types;
    identify at least a first content type of the plurality of content types, wherein the first content type comprises first content in a first format;

identify at least a second content type of the plurality of content types, wherein the second content type comprises second content in a second format;

generate a file map comprising at least the file structure, the first content type, and the second content type;

determine a first rendering schema for the first content type that reflects the first format, wherein the first rendering schema specifies a position to render header content according to a document structure;

determine a second rendering schema for the second content type that simulates the second content, wherein the second rendering schema masks content while maintaining one or more distinguishing features; and generate a simulated thumbnail preview of the file by rendering the first content type according to the first rendering schema and the second content type according to the second rendering schema.

12. The client device of claim 11, wherein at least the file structure of the file is displayed by the simulated thumbnail preview.

13. The client device of claim 11, wherein the first content type is different than the second content type based at least in part on the first format.

14. The client device of claim 11, the computer-executable instructions when executed by the at least one processor further causing the client device to:

determine a portion of the file reducible to a viewable area of a thumbnail preview, wherein the first content type and the second content type are identified within the portion.

15. The client device of claim 14, wherein the viewable area of the thumbnail preview is of a fixed size.

16. The client device of claim 11, wherein the first content type is one of: a bulleted list, a numbered list, a checklist, a title, a section header, a table, a hyperlink, bolded text, or an image.

17. The client device of claim 11, wherein the second content type is one of: minimally formatted text, underlined text, or italicized text.

18. The client device of claim 11, wherein the first content type is visually distinctive based on the first format.

19. A computer storage medium storing computer-executable instructions that when executed by a processor cause a server system to perform operations, comprising:

receiving a file upload;

receiving a file map for the file comprising a file structure and a plurality of content types;

based on the plurality of content types, retrieving at least a first content type comprising first content in a first format;

based on the plurality of content types, retrieving at least a second content type comprising second content in a second format;

determining a first rendering schema for the first content type that reflects the first format, wherein the first rendering schema specifies a position to render header content according to a document structure;

determining a second rendering schema for the second content type that simulates the second content, wherein the second rendering schema masks content while maintaining one or more distinguishing features; and generating a simulated thumbnail preview of the file by rendering the first content type according to the first rendering schema and the second content type according to the second rendering schema, wherein at least the file structure of the file is displayed by the simulated thumbnail preview.

20. The computer storage medium of claim 19, the instructions when executed causing the server system to further perform operations, comprising:

retrieving one or more rules; and executing at least one of the one or more rules to determine the first rendering schema for the first content type that reflects the first format.

* * * * *